US011128505B2

(12) United States Patent
Chen et al.

(10) Patent No.: US 11,128,505 B2
(45) Date of Patent: Sep. 21, 2021

(54) CHANNEL WIDTH, SPATIAL STREAMS, AND SHORT PACKET SIGNALING

(71) Applicants: Intel Corporation, Santa Clara, CA (US); Intel IP Corporation, Santa Clara, CA (US)

(72) Inventors: Xiaogang Chen, Hillsboro, OR (US); Thomas J. Kenney, Portland, OR (US); Shahrnaz Azizi, Cupertino, CA (US); Robert J. Stacey, Portland, OR (US); Laurent Cariou, Portland, OR (US); Qinghua Li, San Ramon, CA (US); Feng Jiang, Santa Clara, CA (US)

(73) Assignee: Intel Corporation and Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/783,666

(22) Filed: Feb. 6, 2020

(65) Prior Publication Data

US 2020/0177425 A1  Jun. 4, 2020

Related U.S. Application Data

(60) Provisional application No. 62/804,796, filed on Feb. 6, 2019, provisional application No. 62/946,079, filed on Dec. 10, 2019.

(51) Int. Cl.
*H04L 27/26* (2006.01)
*H04L 1/00* (2006.01)
*H04L 5/00* (2006.01)
*H04W 84/12* (2009.01)

(52) U.S. Cl.
CPC ........ *H04L 27/2608* (2013.01); *H04L 1/0006* (2013.01); *H04L 5/0044* (2013.01); *H04L 5/0092* (2013.01); *H04W 84/12* (2013.01)

(58) Field of Classification Search
None
See application file for complete search history.

(56) References Cited

U.S. PATENT DOCUMENTS

| 2017/0181136 | A1* | 6/2017 | Bharadwaj | ............ | H04W 84/12 |
| 2019/0141570 | A1* | 5/2019 | Verma | .................. | H04L 5/0007 |
| 2019/0373586 | A1* | 12/2019 | Verma | .................. | H04B 7/0452 |
| 2020/0076552 | A1* | 3/2020 | Cherian | ............ | H04W 72/0426 |
| 2020/0112408 | A1* | 4/2020 | Verma | .................. | H04L 5/0041 |
| 2020/0245297 | A1* | 7/2020 | Venkatesan | .......... | H04B 7/0452 |

* cited by examiner

*Primary Examiner* — Diane L Lo
(74) *Attorney, Agent, or Firm* — Schwegman Lundberg & Woessner, P.A.

(57) ABSTRACT

Methods, apparatuses, and computer readable media include an apparatus of an access point (AP) or station (STA) comprising processing circuitry configured to decode a legacy preamble of a physical layer (PHY) protocol data unit (PPDU), determine whether the legacy preamble comprises an indication that the PPDU is an extremely-high throughput (EHT) PPDU, and in response to the determination indicating the PPDU is the EHT PPDU, decode the EHT PPDU. Some embodiments determine a spatial stream resource allocation based on a row of a spatial configuration table, a row of a frequency resource unit table, a number of stations, and location of the station relative to the number of stations in user fields of an EHT-signal (SIG) field. To accommodate 16 spatial streams, some embodiments extend the length of the packet extension field, extend signaling of a number of spatial streams, and/or extend a number of EHT-SIG symbols.

20 Claims, 15 Drawing Sheets

CHANNEL WIDTH, SPATIAL STREAMS, AND SHORT PACKET SIGNALING

PRIORITY CLAIM

This application claims the benefit of priority under 35 USC 119(e) to U.S. Provisional Patent Application Ser. No. 62/801,796, filed Feb. 6, 2019, and U.S. Provisional Patent Application Ser. No. 62/946,079, filed Dec. 10, 2019, both of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to signaling a channel width, e.g., 320 MHz, and a number of spatial streams. Some embodiments relate to signaling a packet format. Some embodiments relate to signaling an extremely high-throughput (EHT) packet format and a type of packet.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
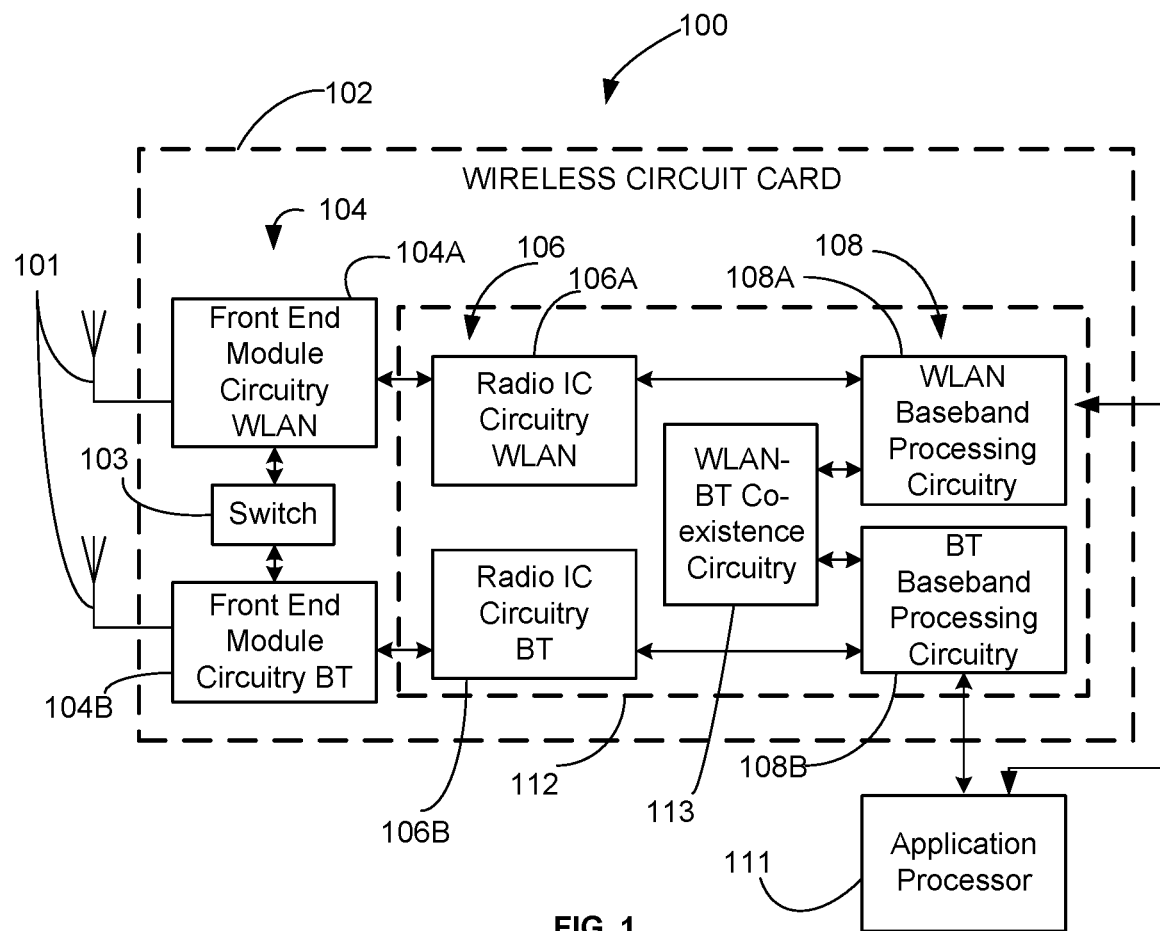
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. In some embodiments, the bandwidth is punctured. The scope of the embodiments is not limited with respect to the above center frequencies however.

Figure 2:
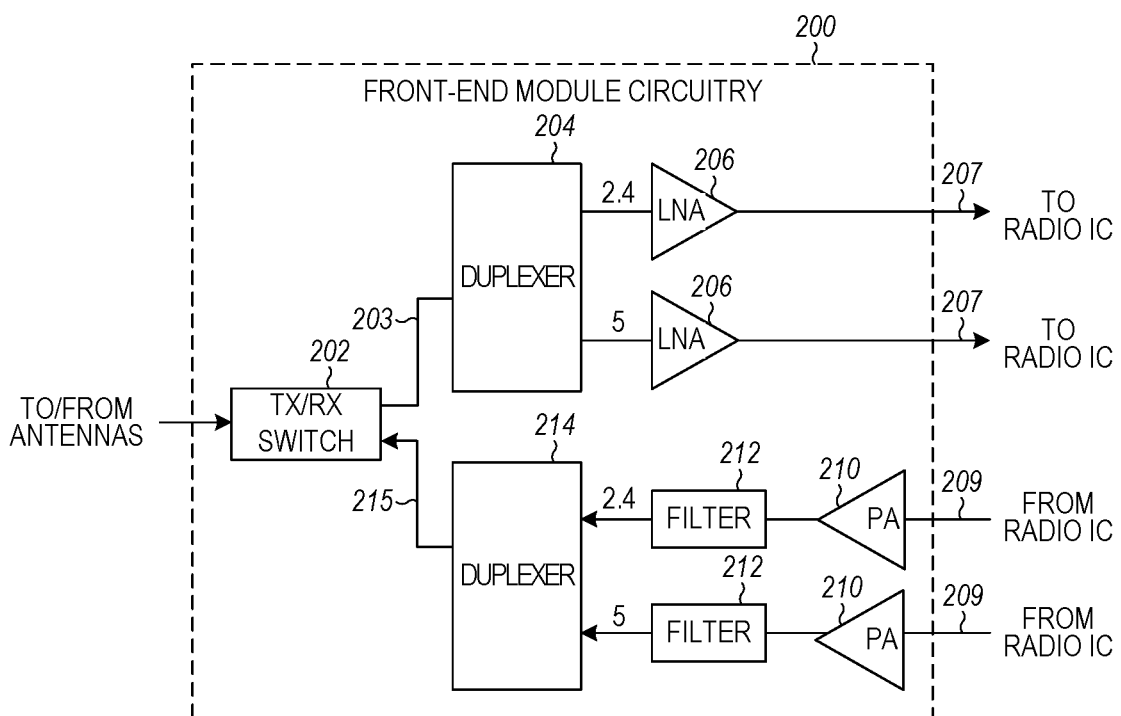
FIG. 2 illustrates FEM circuitry in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
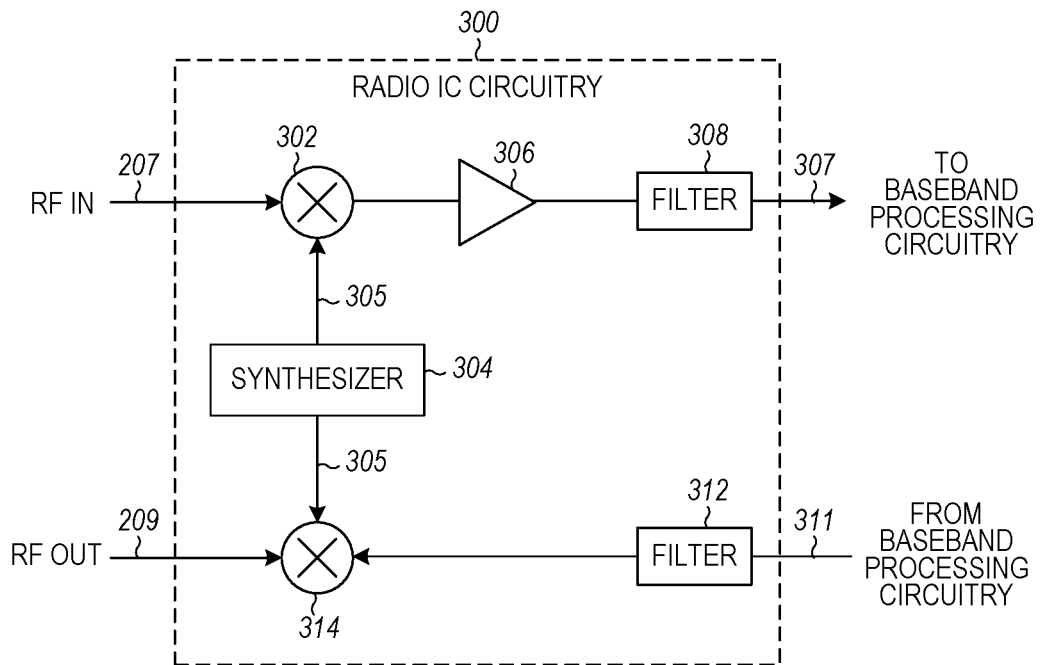
FIG. 3 illustrates radio integrated circuit (IC) circuitry in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{Lo}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fw).

Figure 4:
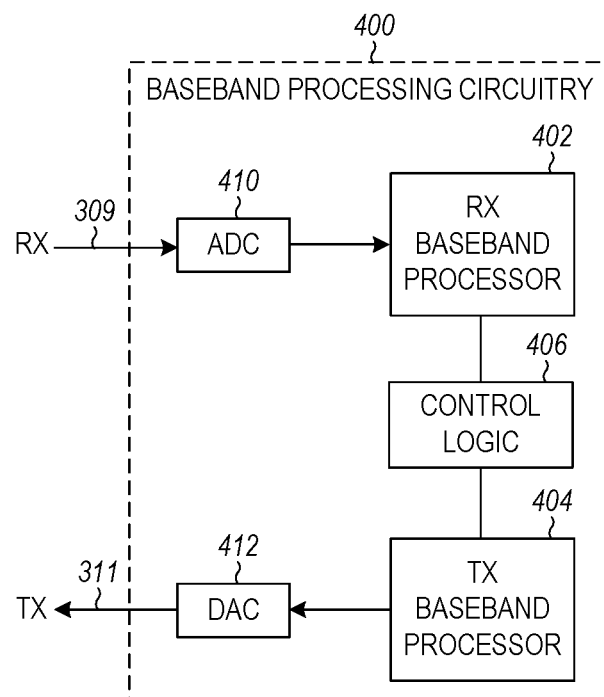
FIG. 4 illustrates a functional block diagram of baseband processing circuitry in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
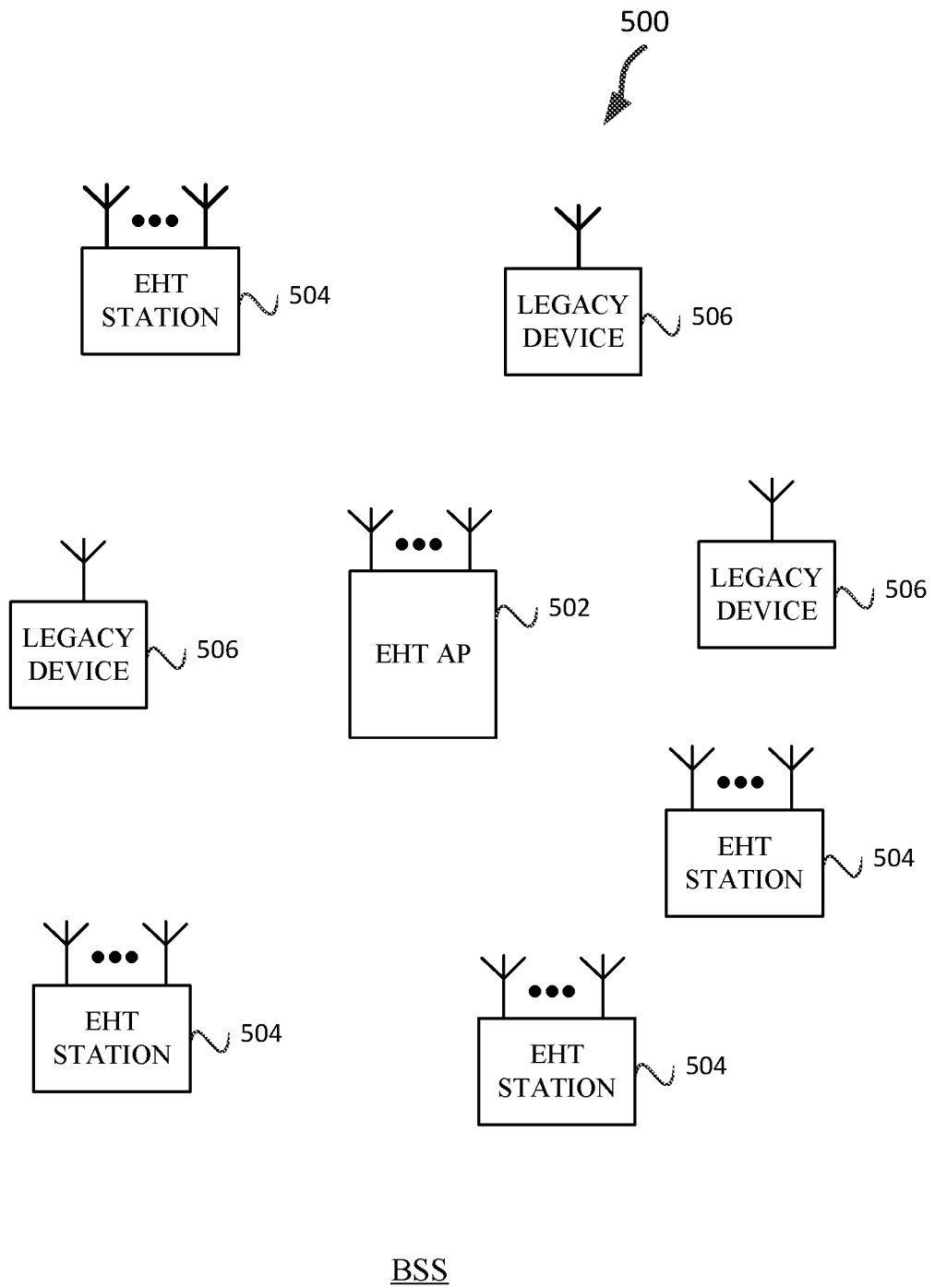
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of EHT (e.g., IEEE 802.11ax/be) stations (STAs) 504, and a plurality of legacy (e.g., IEEE 802.11g/n/ac) devices 506. In some embodiments, the EHT STAs 504 and/or EHT AP 502 are configured to operate in accordance with IEEE 802.11 extremely high throughput (EHT). In some embodiments, the EHT STAs 504 and/or HE AP 520 are configured to operate in accordance with IEEE 802.11az. In some embodiments, IEEE 802.11EHT may be termed Next Generation 802.11. In some embodiments, the EHT AP 502 may be configured to operate a HE BSS, ER BSS, and/or a BSS. Legacy devices may not be able to operate in the HE BSS and beacon frames in the HE BSS may be transmitted using HE PPDU's. An ER BSS may use ER PPDUs to transmit the beacon frames and legacy devices 506 may not be able to decode the beacon frames and thus are not able to operate in an ER BSS. The BSSs, e.g., BSS, ER BSS, and HE BSS, may used different BSSIDs.

The EHT AP 502 may be an AP using the IEEE 802.11 to transmit and receive. The EHT AP 502 may be a base station. The EHT AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. EHT AP 502 may be connected to the internet. The EHT AP 502 and/or EHT STA 504 may be configured for one or more of the following: 320 MHz bandwidth, 16 spatial streams, multi-band or multi-stream operation (e.g., as disclosed in conjunction with FIG. 8), and 4096 QAM.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the EHT AP 502 and EHT STAs 504 are configured to operate in accordance with IEEE 802.11EHT, the legacy devices 506 may include devices that are configured to operate in accordance with IEEE 802.11ax. The EHT STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the EHT STAs 504 may be termed extremely high throughput (EHT) stations or stations.

The EHT AP 502 may communicate with legacy devices 506 in accordance with legacy IEEE 802.11 communication techniques. In example embodiments, the EHT AP 502 may also be configured to communicate with EHT STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the EHT AP 502, EHT STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax embodiments, a EHT AP 502 may operate as a master station which may be arranged to contend for a wireless medium (e.g., during a contention period) to receive exclusive control of the medium for a transmission opportunity (TXOP). The EHT AP 502 may transmit an EHT/HE trigger frame transmission, which may include a schedule for simultaneous UL transmissions from EHT STAs 504. The EHT AP 502 may transmit a time duration of the TXOP and sub-channel information. During the TXOP, EHT STAs 504 may communicate with the EHT AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the EHT AP 502 may communicate with EHT stations 504 using one or more HE or EHT frames. During the TXOP, the EHT STAs 504 may operate on a sub-channel smaller than the operating range of the EHT AP 502. During the TXOP, legacy stations refrain from communicating. The legacy stations may need to receive the communication from the EHT AP 502 to defer from communicating.

In accordance with some embodiments, during the TXOP the EHT STAs 504 may contend for the wireless medium with the legacy devices 506 being excluded from contending for the wireless medium during the master-sync transmission. In some embodiments the trigger frame may indicate a UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The EHT AP 502 may also communicate with legacy stations 506 and/or EHT stations 504 in accordance with legacy IEEE 802.11 communication techniques. In some embodiments, the EHT AP 502 may also be configurable to communicate with EHT stations 504 outside the HE TXOP in accordance with legacy IEEE 802.11 or IEEE 802.11EHT/ax communication techniques, although this is not a requirement.

In some embodiments the EHT station 504 may be a "group owner" (GO) for peer-to-peer modes of operation. A wireless device may be a HE station 502 or a EHT AP 502. In some embodiments, the EHT STA 504 and/or EHT AP 502 may be configured to operate in accordance with IEEE 802.11mc. In example embodiments, the radio architecture of FIG. 1 is configured to implement the EHT STA 504 and/or the EHT AP 502. In example embodiments, the front-end module circuitry of FIG. 2 is configured to implement the EHT STA 504 and/or the EHT AP 502. In example embodiments, the radio IC circuitry of FIG. 3 is configured to implement the EHT station 504 and/or the EHT AP 502. In example embodiments, the base-band processing circuitry of FIG. 4 is configured to implement the EHT station 504 and/or the EHT AP 502.

In example embodiments, the EHT stations 504, EHT AP 502, an apparatus of the EHT stations 504, and/or an apparatus of the EHT AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-18.

In example embodiments, the EHT station 504 and/or the EHT AP 502 are configured to perform the methods and operations/functions described herein in conjunction with FIGS. 1-18. In example embodiments, an apparatus of the EHT station 504 and/or an apparatus of the EHT AP 502 are configured to perform the methods and functions described herein in conjunction with FIGS. 1-18. The term Wi-Fi may refer to one or more of the IEEE 802.11 communication standards. AP and STA may refer to EHT/HE AP 502 and/or EHT/HE station 504 as well as legacy devices 506.

In some embodiments, a HE AP STA may refer to a EHT AP 502 and/or a EHT STAB 504 that is operating as a HE APs 502. In some embodiments, when a EHT STA 504 is not operating as a HE AP, it may be referred to as a HE non-AP STA or HE non-AP. In some embodiments, EHT STA 504 may be referred to as either a HE AP STA or a HE non-AP. EHT may refer to a next generation IEEE 802.11 communication protocol, which may be IEEE 802.11be or may be designated another name.

Figure 6:
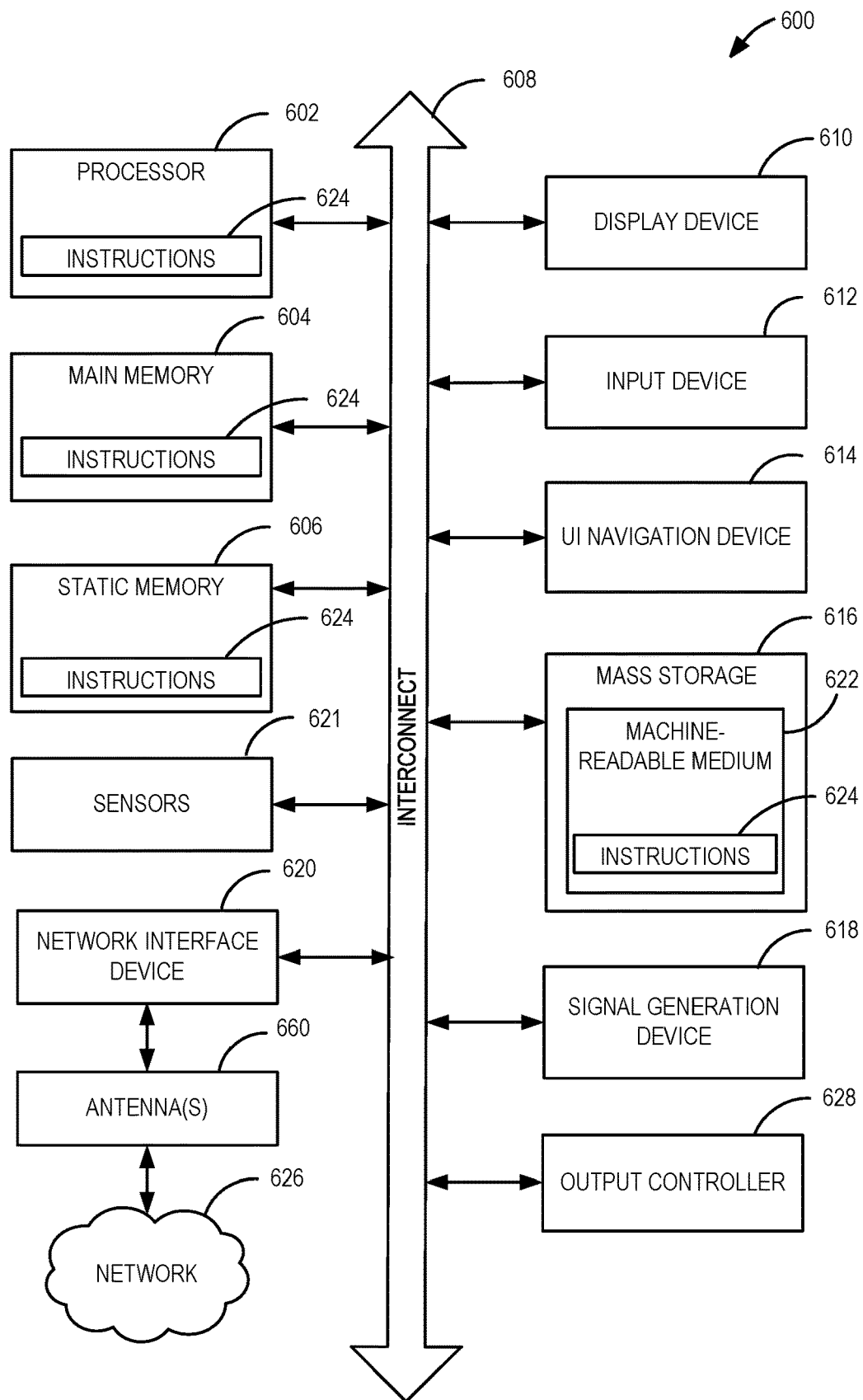
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a EHT AP 502, EHT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
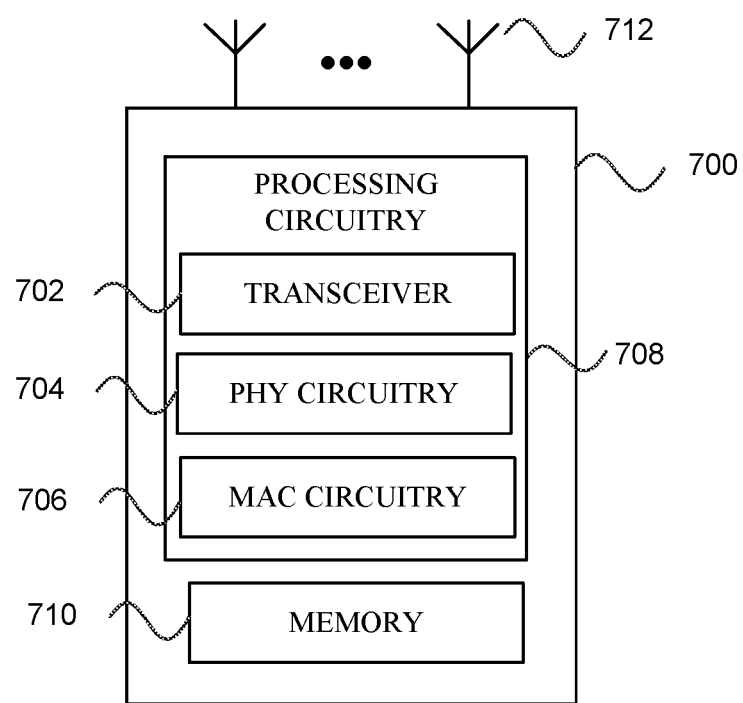
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a EHT STA 504, EHT AP 502, and/or a HE STA or HE AP. A EHT STA 504, EHT AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., EHT AP 502, EHT STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., EHT AP 502 and/or EHT STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the EHT stations 504 of FIG. 5 or wireless device 700) and an access point (e.g., the EHT AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

A technical problem in IEEE 802.11 is how to integrate a new generation with the old generations. A new amendment often requires new SIG fields that include information to support new physical (PHY)/media access control (MAC) features for the new amendment. The new SIGs are placed after the L-SIG field so that legacy device 506 will decode the L-SIG and determine a length of the PPDU or packet and defer from transmitting for a time based on the length. When new SIG fields have been defined in a new amendment, for example the IEEE 802.11ax HE-SIG-A, only devices that support IEEE 802.11ax and any follow-on amendments (e.g. IEEE 802.11be) can decode the information in the HE-SIG-A field. Pre-IEEE 802.11ax devices (e.g. legacy device 506) are not able to decode later generation SIG field as they do not know the format to decode the later generation SIG field, e.g., HE-SIG-A or EHT-SIG. However, some of the information (e.g., BSS color, TxOP duration, bandwidth) in later generation SIGs (e.g., HE-SIGA or EHT-SIG) needs to be signaled in future amendments for coexistence, e.g., intra-physical layer (PHY) protocol data unit (PPDU) PPDU power save.

Some embodiments improve coexistence among different IEEE 802.11 STAs (e.g., EHT STAs 504 and HE STAs) and therefore improve overall network efficiency and enable power saving. For example, in some embodiments, intra-PPDU power saving and spatial reuse are improved by providing a common preamble with a common SIG field that also may reduce detection and classification of PPDUs.

Figure 8:
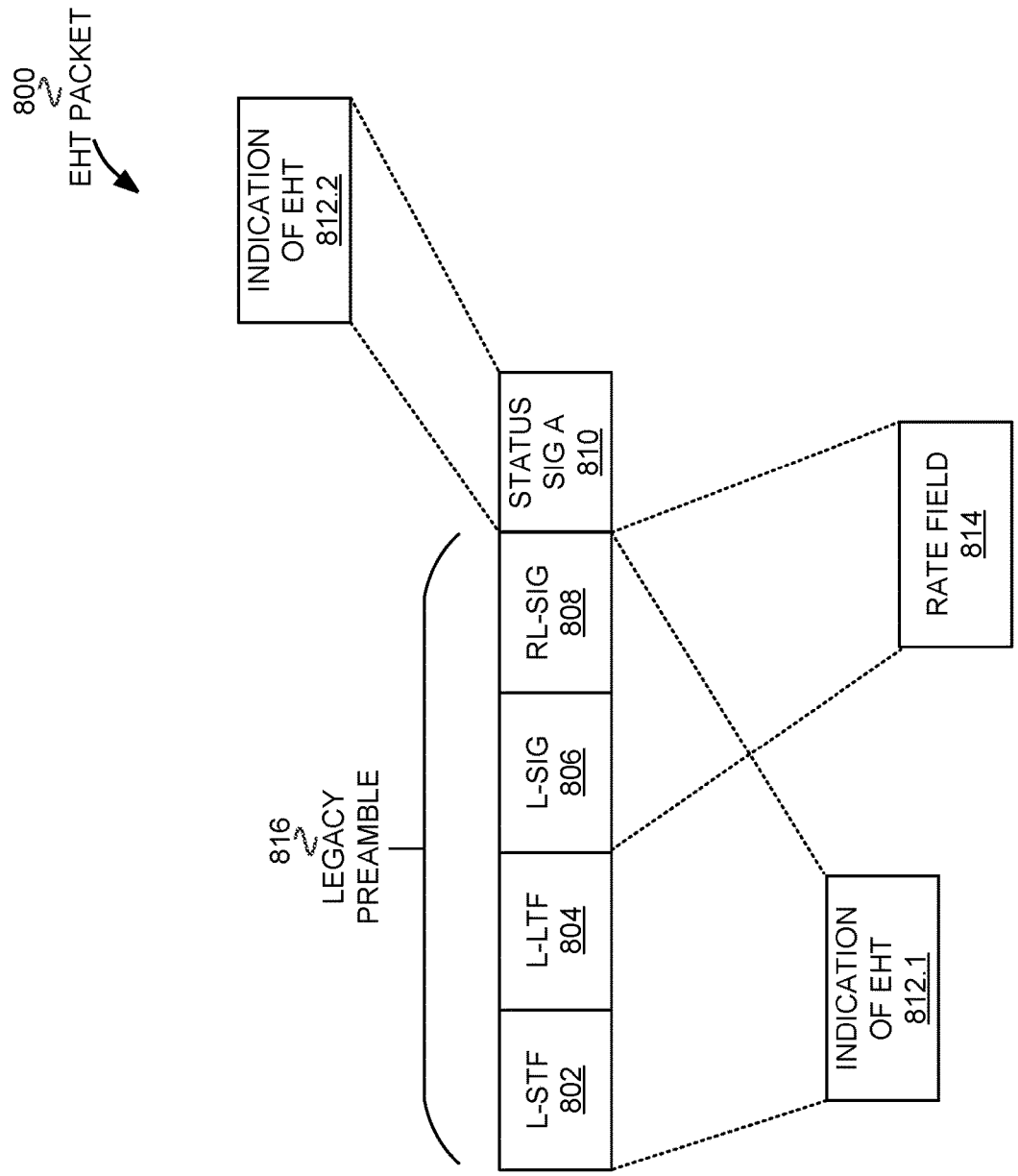
FIG. 8 illustrates an EHT PPDU with a universal signal field (U-SIG), in accordance with some embodiments.

FIG. 8 illustrates an EHT packet 800 in accordance with some embodiments. Illustrated in FIG. 8 is EHT packet 800, which includes one or more of non-HT short training field (L-STF 802), Non-HT Long Training field (L-LTF 804), Non-HT SIGNAL field (L-SIG 806), Repeated Non-HT SIGNAL field (RL-SIG 808), and status SIG A 810. The legacy preamble 816 includes L-STF 802, L-LTF 804, L-SIG 806, and RL-SIG 808. The legacy preamble 816 is part of an EHT preamble if the legacy preamble 816 includes the indication of EHT 812.1 since the format of the legacy preamble 816 includes signaling to indicate that the EHT packet 800 is configured in accordance with IEEE 802.11be. L-SIG field 806 and RL-SIG 808 include rate field 814. Rate field 814 may be the same or similar as rate field 1006. The EHT packet 900 may be a PPDU. Status SIG A field 810 may be the same or similar as status SIG-A field 1000.

The indication of EHT 812.1, 812.2 may be indicated by one or more fields of the EHT packet 800. The indication of EHT 812 may include two or more indications, e.g., referring to FIG. 12, negated L-SIG 1205 as −RL-SIG 1206 and the symbol rotations of QBPSK 1210 of EHT-SIG1 1207 and BPSK 1212 of EHT-SIG2 1208. The indication of EHT 812.1 may be that the signals of L-SIG field 906 are negated, e.g., multiplied by −1. The indication of EHT 812 may include one or more symbols being transmitted in accordance with BPSK and/or QBPSK, and/or a combination of two or more symbols being transmitted in accordance with BPSK and/or QBPSK to form a combination, e.g., first BPSK and second QBPSK. In some embodiments, the indication of EHT-SIG 812 is setting the length field in the L-SIG 2106 (and RL-SIG 2108 in some embodiments) to a value so that the length indicated mod 3 is equal to 0 or another value, e.g., 1 or 2.

In some embodiments, indication of EHT 812.1 is a value of the rate field 814. Previous versions of Wi-Fi specification and/or IEEE 802.11 indicate that the rate field 814 is to indicate 6 MB/s, e.g., see Table 1 and FIG. 10. For example, IEEE 802.11n, e.g., high-throughput (HT), indicates the rate field 814 of the L-SIG field 806 indicate 6 MB/s. In another example, IEEE 802.11ac, e.g., very-high throughput (VHT), indicates the rate field 814 of the L-SIG field 806 indicate 6 MB/s. In another example, IEEE 802.11ax, high-efficiency (HE), indicates the rate field 814 of the L-SIG field 806 indicate 6 MB/s. Legacy device 504 may be configured to operate in accordance with one or more of IEEE 802.11n/ac/ax as well as other legacy communication protocols as disclosed in conjunction with FIG. 5.

In some embodiments, the legacy devices 504 will determine that the EHT packet 800 is not a packet in accordance with a legacy communication standard because of the value of the rate field 814 does not indicate 6 MB/s. In some embodiments, the rate field 814 value may indicate a format of the EHT packet 800. In some embodiments, indication of EHT 812.1 may not be present, but indication of EHT 812.2 is present.

In some embodiments, EHT STA 504 and/or EHT AP 502 are configured to determine the EHT packet 800 is an EHT packet based on RL-SIG 808 being L-SIG field 806 negated. In some embodiments, EHT STA 504 and/or EHT AP 502 are configured to negate RL-SIG field 808 and combine the L-SIG 806 and RL-SIG field 808 to improve reliability. The rate field 814 may indicate a packet format or channel format.

Legacy device 506 configured to operate in accordance with IEEE 802.11ax would check to see if L-SIG field 906 and RL-SIG 908 are the same, but since RL-SIG 908 is negated the legacy device 506 would determine that the EHT packet 900 is not an IEEE 802.11ax packet.

In some embodiments, signaling the packet type, e.g., communication standards type of IEEE 802.11be, by using the rate field 814 enables EHT STA 504 and/or EHT AP 502 to determine the packet type quickly without requiring additional symbols after the legacy preamble 816. In some embodiments, mode detection and signaling for each new communication standard starting with IEEE 802.11n required two or more symbols after the L-SIG. For example, in IEEE 802.11ax, immediately following the L-SIG a RL-SIG was added, along with two symbols of a HE-SIG-A. The legacy device 506 configured to operate in accordance with IEEE 802.11ax required these symbols to be decoded before any signaling of the current packet could be conveyed. In addition, two symbols of a SIG field were required in .11n/.11ac in order to do packet classification. This puts a restriction on what type of signaling can be used, and how soon the packet can utilize new modes of operation until 2 to 3 symbols after the L-SIG are processed, in accordance with some embodiments. In some embodiments, the rate field 914 value indicates one of a number, e.g., 2, 3, 4, 5, 6, . . . , 16, of different packet formats or types.

Figure 9:
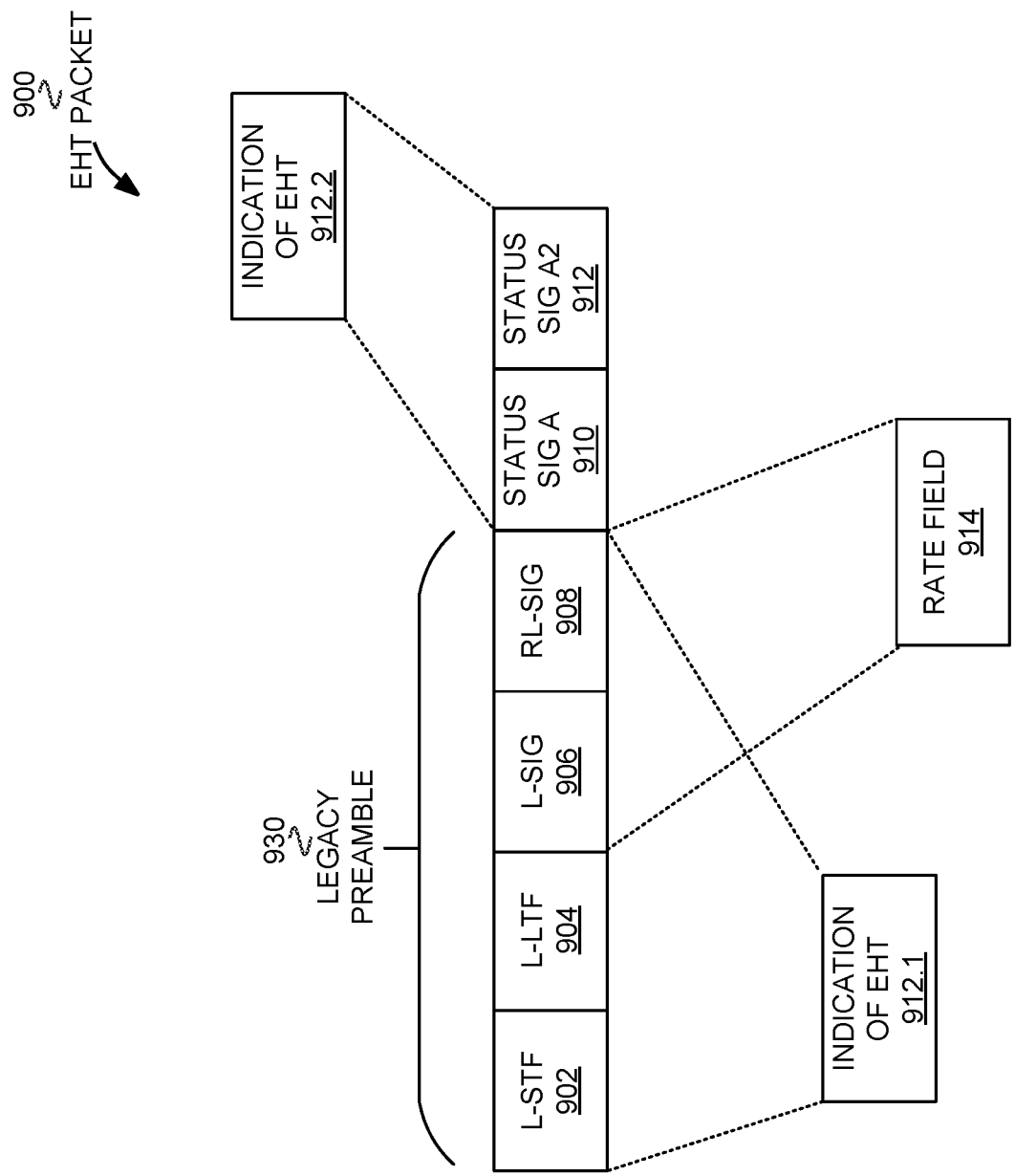
FIG. 9 illustrates an EHT packet, in accordance with some embodiments.

FIG. 9 illustrates an EHT packet 900, in accordance with some embodiments. Illustrated in FIG. 9 is EHT packet 900, which includes one or more of L-STF 902, L-LTF 904, L-SIG 906, RL-SIG 908, status SIG A 910, and/or status SIG A2 912. L-STF 902 may be the same or similar as L-STF 802. L-LTF 904 may be the same or similar as L-LTF 804. L-SIG 906 may be the same or similar as L-SIG 806. RL-SIG 908 may be the same or similar as RL-SIG 808. Status SIG A 910 may be the same or similar as status SIG A 810. SIG A2 912 may be the same or similar as status SIG-A 1100. Indication of EHT 912.1 may be the same or similar as indication of EHT 812.1. Indication of EHT 912.2 may be the same or similar as indication of EHT 812.2. In some embodiments, status SIG A 910 is modulated using QBPSK (or BPSK) and status SIG A2 912 is modulated with BPSK (or QBPSK), the one that SIG A 910 is not modulated with. The indication of EHT 912.1 may be the different modulation of status SIG A 910 and status SIG A2 912. In some embodiments, indication of EHT 912.2 and indication of EHT 912.1 are used.

In some embodiments, EHT packet 800, 900, and/or 1200 may be a short ACK/NACK or other short signaling. Early signaling, e.g., rate field 814, 914, 1006, enables short packets or the set-up of special services within a BSS 500. In some embodiments, early signaling, e.g., rate field 814, 914, 1006, signals a short packet. In some embodiments, a short packet is a response such as an ACK/NACK. The short packet includes the legacy preamble 830, 930 followed by the signaling required to indicate EHT mode and a few data symbols, in accordance with some embodiments. In some embodiments, status SIG A2 912 indicates a few data symbols. In some embodiments, EHT packet 800, 900 is a short packet. In some embodiments the type of packet of the EHT packet 800, 900, 1200, a channel, and/or coding information is indicated by a combination of a value of the rate field of the L-SIG 806, 906 and a value of the rate field of the RL-SIG 808, 908.

In some embodiments, the indication of EHT 812, 912 is negating L-SIG 806, 906 to transmit RL-SIG 808, 908, respectively. The data/SIG symbols following the RL-SIG 808, 908, e.g., status SIG A 810, 910, indicate a configuration or signal. In some embodiments, the short packet could is a short ACK. For the short ACK/NACK, the symbols or symbols of data are an identifier of the STA, such as a short address or an AID, e.g., STA ID 1102. It could also have a few bits in the few data symbols to provide a counter for ACKing multiple transmissions.

In some embodiments, status SIG A 910 and status SIG A2 912 are two symbols that encode 42 bits of information/signaling in addition to a CRC and tail. In some embodiments, data symbols or additional data (for example, 1 data symbol, 2 data symbols, 3 data symbols, 4 data symbols, etc.) symbols follow or replace status SIG A 810, 910, and/or status SIG A2 912.

Using a short packet 800, 900 may be used ACK/NACK for a HARQ mechanism. The short packet 800, 900 being an ACK/NACK will enable a short transmission time and low overhead for encoding and decoding, which is beneficial to HARQ transmissions.

The number of symbols following the legacy preamble 830, 930 may be zero to n, where n may be large, but the larger n is the longer the EHT packet 800, 900, which will reduce efficiency.

In some embodiments, EHT packet 800 or EHT packet 900 is a short ACK using the rate field 814, 914 to indicate the packet type of short ACK. In some embodiments, STA association ID (AID), or STA ID 1102, e.g., an identification of station, which may be 11 bits or another number of bits, is transmitted along with up to 5 bits of information (e.g., 4 bits 1106 may be expanded to 5 bits) along with 4 bit CRC 1104 and 6 bit tail 1108. In some embodiments, fewer bits are used for signaling while providing more to the CRC.

In some embodiments, guard tone (not illustrated) of the L-SIG 806, 906, and/or RL-SIG 808, 808, are used to train the equalizer of the receiver (e.g., EHT AP 502 and/or EHT STA 504) such that up to a full 52 data subcarriers are used in the Status SIG-A 810, 910, and/or status SIG-A2 912. In some embodiments, for reliability status SIG-A 810, 910, and/or status SIG A2 912 are sent using the lowest MCS. In some embodiments, status SIG A 810, 910 is transmitted using QBPSK to indicate the packet type (e.g., short ACK) or to indicate of EHT 912.2, which may be in addition to indication of EHT 912.1, e.g., RL-SIG 908 may be the negation of L-SIG 906 to indicate EHT packet 900, and status SIG A 910 may be transmitted in accordance with QBPSK to indicate EHT packet 900.

EHT packet 900 includes two symbols (status SIG 910 and status SIG-A2 912) for signaling/identification. The two symbols allow for using more than one STA ID, or multiple tags in one transmission. Using two symbols provides up to 42 bits of signaling, assuming a 4 bit CRC and 6 bit tail. Status SIG-A 810 910 may be more than one symbol in accordance with some embodiments.

In some embodiments, for a short packet, e.g., short ACK of EHT packet 800, 900, the rate field 814, 914 is used with the shortest duration, i.e. the highest data rate, "0011", 54 Mb/s, since the EHT packet 800, 900, is very short so the length field 1010 can be set to cover the duration of the EHT packet 800, 900 as a short packet. Additionally, two RATE values could be used, where after the first symbol of the Status SIG-A is sent using the lowest MCS and the next symbol(s) are sent with a higher MCS for greater network efficiency.

Status SIG A 810, 910, and/or status SIG A2 912 may include an indication of a packet type. For example, the first symbol after the RL-SIG 808, 908 may indicate a type of packet or format of a packet.

Figure 10:
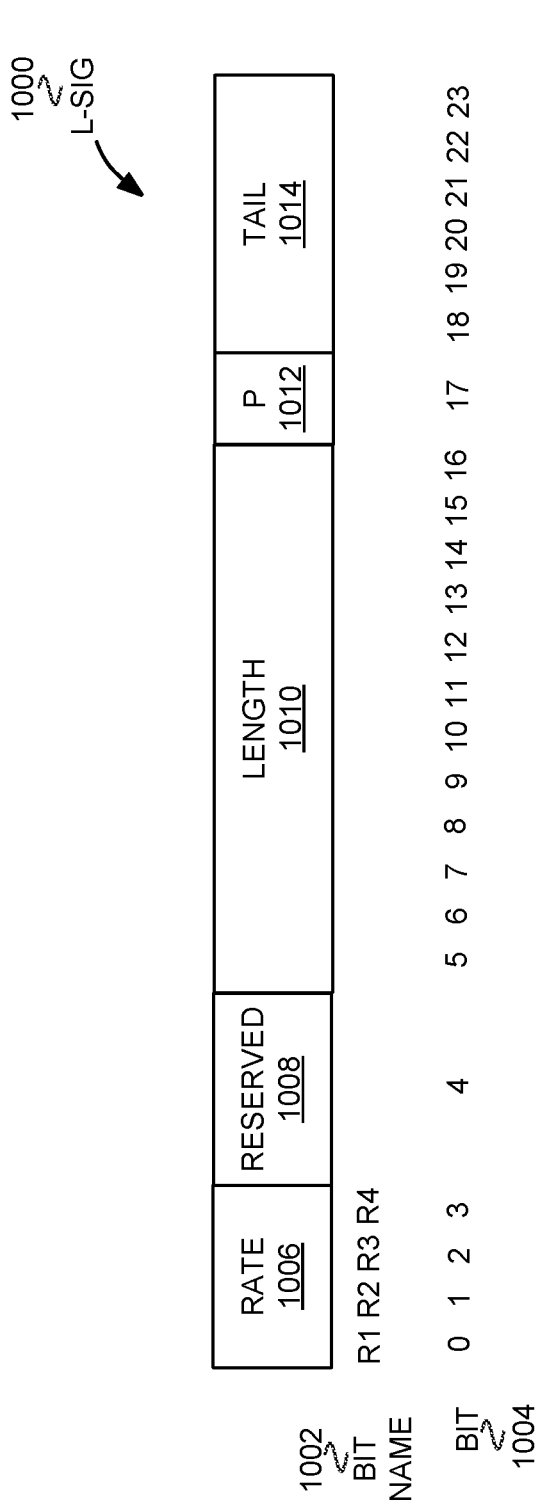
FIG. 10 illustrates a legacy signal field (L-SIG), in accordance with some embodiments.

FIG. 10 illustrates a legacy signal field (L-SIG) 1000, in accordance with some embodiments. Illustrated in FIG. 10 is bit name 1002, bit 1004, rate field 1006, reserved 1008, length field 1010, P 1012, tail 1014. The Rate field 1006 may indicate a Mb/s as disclosed in conjunction with Table 1. Where bit names 1002 R1, R2, R3, and R4 correspond to Bits R1-R4 of Table 1. A rate that does not indicate 6 Mb/s would signal that the communication standard is not a legacy communication standard, e.g., IEEE 802.11n/ac/ax.

TABLE 1

L-SIG Contents for RATE field

| Bits R1-R4 | Rate (Mb/s) (20 MHz channel spacing) |
|---|---|
| 1101 | 6 |
| 1111 | 9 |

TABLE 1-continued

L-SIG Contents for RATE field

| Bits R1-R4 | Rate (Mb/s) (20 MHz channel spacing) |
|---|---|
| 0101 | 12 |
| 0111 | 18 |
| 1001 | 24 |
| 1011 | 36 |
| 0001 | 48 |
| 0011 | 54 |

Values other than "1101" that indicates 6 Mb/s may be used by in EHT packets 800, 900 to indicate a packet format and/or channel format. In some embodiments, R1, R2, and R3 are available for signaling, which enables 8 states. In some embodiments, R1, R2, R3, and R4 are available for signaling, which enables 16 states.

The L-SIG 1000 has one CRC bit or parity check bit. Some manufactures use other bits in the L-SIG 1000 to make the parity more robust. For example, some manufactures use the reserved field 1008 (1 bit) and/or R4. In some embodiments, legacy devices 506 are configured to determine deferral times for all the values of rate indicated in Table 1.

The legacy devices 506, EHT AP 502, and/or EHT STA 506 may be configured to determine a deferral time based on the value indicated by the length field 1010 and the rate indicated by the rate field 1006. The length field 1010 may be 12 bits, e.g., bits 1004 5-16. The length field 1010 may indicate a length in octets of the PSDU of the EHT packet 800, 900, 1200, e.g., PSDU 1220. A transmission time (TXTIME) can be determined from the value indicated by the rate field 1006 and the value indicated by the length field 1010. Legacy devices 506 are required to determine a deferral time based on the value indicated by the length field 1010 and the value indicated by the rate field 1006. For example, "9.13.4 L_LENGTH and L_DATARATE parameter values for HT-mixed format PPDUs. L_LENGTH and L_DATARATE determine the duration that non-HT STAs will not transmit, equal to the remaining duration of the HT PPDU or the L-SIG duration when L-SIG TXOP protection is used as defined in 9.13.5, following the non-HT portion of the preamble of the HT-mixed format PPDU." As indicated by IEEE 802.11.

Increasing the data rate indicated by the rate field 1006, reduces the duration that can be indicated by the combination of the value of the rate field 1006 and the value of the length field 1010.

TABLE 2

Max TXTIME

| Bits R1-R4 | Rate (Mb/s) (20 MHz channel spacing) | Max TXTIME That can be conveyed (msec) |
|---|---|---|
| 1101 | 6 | 5.48 |
| 1111 | 9 | 3.66 |
| 0101 | 12 | 2.75 |
| 0111 | 18 | 1.84 |
| 1001 | 24 | 1.38 |
| 1011 | 36 | 0.93 |
| 0001 | 48 | 0.70 |
| 0011 | 54 | 0.63 |

Table 2 indicates a maximum TXTIME that can be indicated for different values of the rate field 1006 assuming the length field 1010 indicates a maximum value. In some embodiments, a value of bits R1-R3 of 111, 010, 011, 100, 101, 000, and/or 001 indicates a packet, channel format, or configuration for EHT packets 800, 900, 1200, in accordance with some embodiments. In some embodiments, 1111, 0101, 0111, 1001, 1011, 0001, 0011, 1110, 0100, 0110, 1000, 1010, 0000, and/or 0010 indicates a packet, channel format, or configuration for EHT packets 800, 900, 1200, in accordance with some embodiments.

Reserved field 1008 may be a reserved field. The reserve field 1008 may be used by some manufacturers to perform error checking, e.g, a parity bit or CRC check, in accordance with some embodiments.

In previous systems from IEEE 802.11n to IEEE 802.11ax, legacy devices 506 need to decode a few symbols after the L-SIG before system parameters for the packet are known. In IEEE 802.11ax, several symbols (3 to 7) after the L-SIG are used to signal different packet types. Thus, very short packets are not possible in the legacy communication standards.

By using the rate field 1006 to indicate a packet format, very short packet may be used, in accordance with some embodiments. Additionally, the U-SIG 810, 910, and/or status SIG A2 912, may signal a packet format, channel configuration, and/or configuration. In legacy communication standards, the signaling is in the bits that in the HE-SIG-A, HT-SIG-A, and/or VHT-SIG-A, in accordance with some embodiments. Thus, in the legacy systems, the most urgent bits were placed in the HE-SIG-A (or equivalent) for all these systems. In legacy communication standards, a minimum of two symbols after the L-SIG is needed to signal packet formats.

In some embodiments, the rate field 1006 is to signal a new short packet type. In IEEE 802.11ax there are 5 types of packets HE SU, HE MU, HE SU ER, HE TB, HE NDP PPDU's. Each packet type is indicated by different methods, e.g., constellation rotation of the HE SIGA symbols or remainder of the L-length field. In some embodiments, the EHT STA 504 and/or EHT AP 502 use the rate field 1006 to indicate a packet, which enables the EHT STA 504 and/or EHT AP 502 decoding the EHT packet 800, 900, 1200 to determine the packet configuration, which may be different for each packet type, e.g., the preambles may be different for each packet type, after decoding the L-SIG 806, 906, 1205.

The EHT AP 502 and/or EHT STA 504 may be configured to determine which value to indicate with the length field 1010 based on the value indicated in the rate field 1006.

Additionally, the SIG-A in the legacy communication standards has to be detected on each 20 MHz band, regardless of a larger bandwidth transmission. Thus, the SIG-A was repeated in each 20 MHz, since there was no way for a legacy device 506 to know bandwidth. The repetition of the SIG-A for each 20 MHz consumes a lot of energy, so many legacy devices 506 don't utilize the larger bandwidth (e.g., 80 MHz) signal to improve detection performance of the SIG-A. Thus, one use for this early signaling using the rate field 1006 is to signal the total bandwidth, in accordance with some embodiments. For instance, if the transmission was to be 40 MHz the 9 Mb/s rate could be used to indicate a 40 MHz bandwidth. Other values in Table 1 are used to indicate a bandwidth (e.g., 40 MHz, 80 MHz, 160 MHz, 320 MHz, etc.), in accordance with some embodiments. For example, when a EHT packet 800, 900, 1200 is 40 MHz (or another value over 20 MHz), the rate field 1006 may set bits R1-R4 to 1111, to signal 9 Mb/s and the bandwidth of the EHT packet 800, 900, 1200. The EHT AP 502 and/or EHT STA 504 determine a value of the length field 1010 to indicate the TXTIME of the EHT packet 800, 900, 1200.

Figure 11:
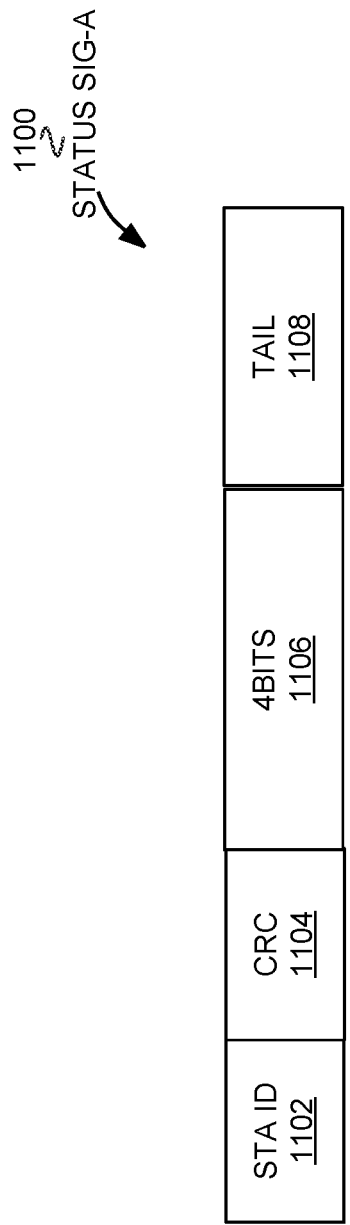
FIG. 11 illustrates a status SIG-A, in accordance with some embodiments.

FIG. 11 illustrates a status SIG-A 1100, in accordance with some embodiments. Illustrated in FIG. 11 is status SIG-A 1100, which includes one or more of the following fields. STA ID 1102 which may be a station identification (ID) of the transmitting EHT AP 502 or EHT STA 504. CRC field 1104 which may indicate a value for a cyclic redundancy check value of the status SIG-A 1000. The status SIG-A 810, 910, 1000 and/or status SIG A2 912 may be referred to as an EHT-SIG, in accordance with some embodiments. Status SIG-A 1000 may be the same or similar as status SIG-A 910, status SIG A2 912, status SIG A 810, EHT-SIG1 1207, and/or EHT-SIG2 1208. 4 bits 1106 are bits that may be reserved, in accordance with some embodiments. 4 bits 1106 are bits that may be used in conjunction with the CRC 1104, in accordance with some embodiments. Tail field 1108 may be a field for enabling the EHT AP 502 and/or EHT STA 504 to finish decoding, in accordance with some embodiments.

Figure 12:
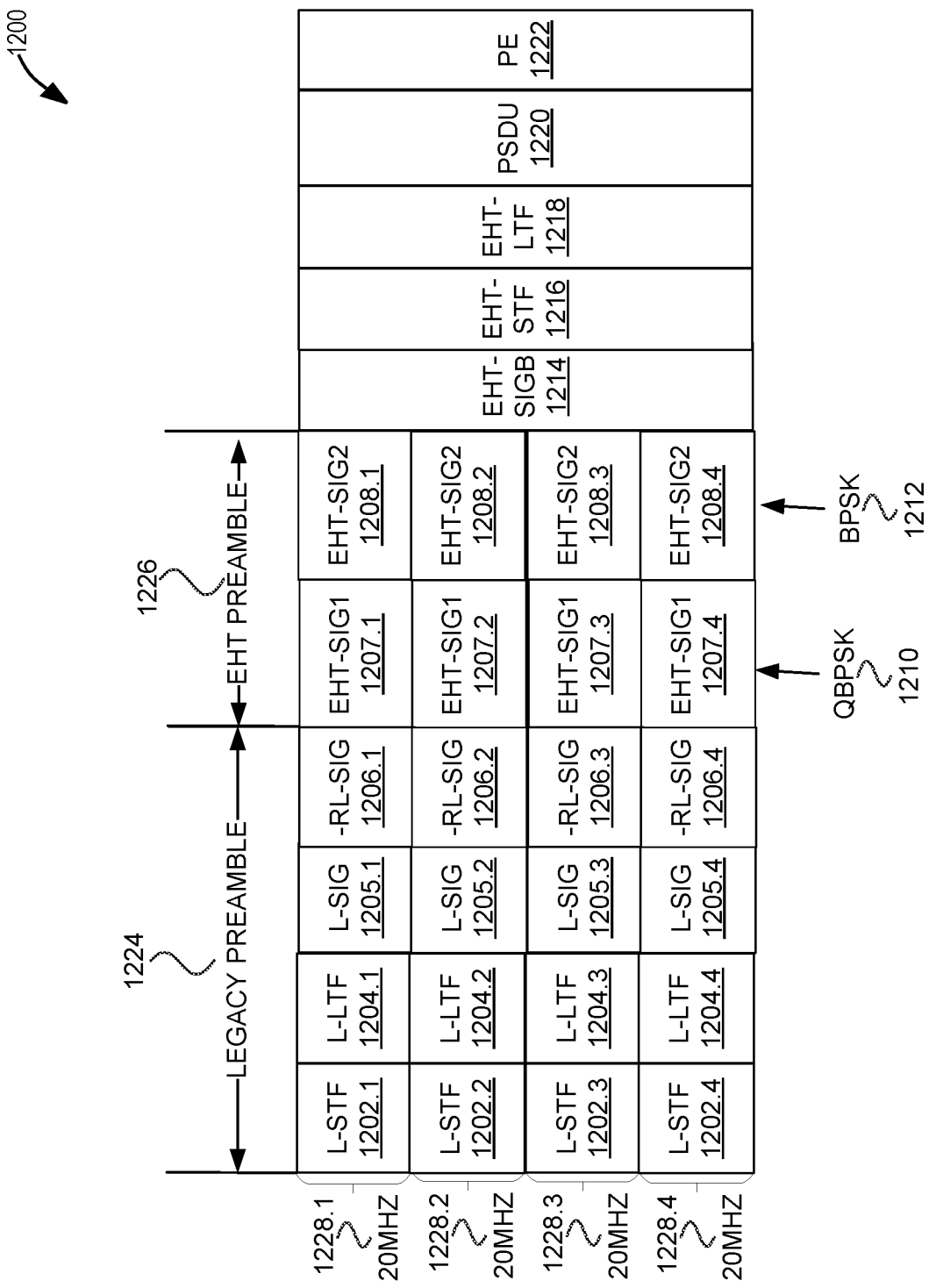
FIG. 12 illustrates an EHT packet structure, in accordance with some embodiments.

FIG. 12 illustrates an EHT packet structure 1200, in accordance with some embodiments. As illustrated EHT packet structure 1200 includes negated RL-SIG –RL-SIG 1206 as an indication of EHT 812.1.

Illustrated in FIG. 12 is L-STF 1202, L-LTF 1204, L-SIG 1205, RL-SIG 1206, EHT-SIG1 1207, EHT-SIG2 1208, EHT-SIGB 1214, EHT-STF 1216, EHT-LTF 1218, PSDU 1220, PE 1222, legacy preamble 1224, EHT preamble 1226, and 20 MHz 1228.1 through 20 MHz 1228.4. L-STF 1202, L-LTF 1204, L-SIG 1205, and RL-SIG 1206 are the same or similar as L-STF 802, 902, L-LTF 804, 904, L-SIG 806, 906, and RL-SIG 808, 908, respectively. The legacy preamble 1224 and EHT preamble 1226 is transmitted on each 20 MHz channel 2028 and EHT-SIGB 1214 through PE 1222 are transmitted on the entire 80 MHz channel, in accordance with some embodiments. The legacy preamble 1224 may be the same or similar as legacy preamble 816, 916. In some embodiments, EHT-SIGB 1214, EHT-STF 1216, EHT-LTF 1218, and/or PSDU 1220 are optional. In some embodiments, the EHT-SIG1 1207 and EHT SIG2 1208 are transmitted across the entire 80 MHz channel. The indication of EHT 812.1, 912.1 enable the receiver (e.g., EHT STA 504 and/or EHT AP 502) to determine that the packet is a EHT packet 800, 900 after decoding –RL-SIG 1206, and thus there is no need to transmit the EHT-SIG1 1207 per 20 MHz. In some embodiments, the rate field 814 or another indication may indicate a channel width after the RL-SIG 808, e.g., 20 MHz, 40 MHz, 80 MHz, 160 MHz, 320 MHz, etc. In some embodiments, having the indication of a channel width as part of the legacy preamble 1224, enables the EHT-SIG1 1207 to not have to be transmitted every 20 MHz channel as the receiver will know what channel width to receive the EHT-SIG1 1207.

In some embodiments, the indication of EHT 812, 912, and rate field 814 are indicating the communication standard (EHT) and/or a packet format, e.g., in PHY portion of the EHT packet 800, 900, 1200, rather than a MAC portion of the EHT packet 800, 900, 1200, which may provide faster decoding and determination of the communication standard (e.g., EHT) and/or the type of packet. In some embodiments, the rate field 1006 indicates whether one or more fields are modulated with DCM for a MCS and/or a MCS.

Figure 13:
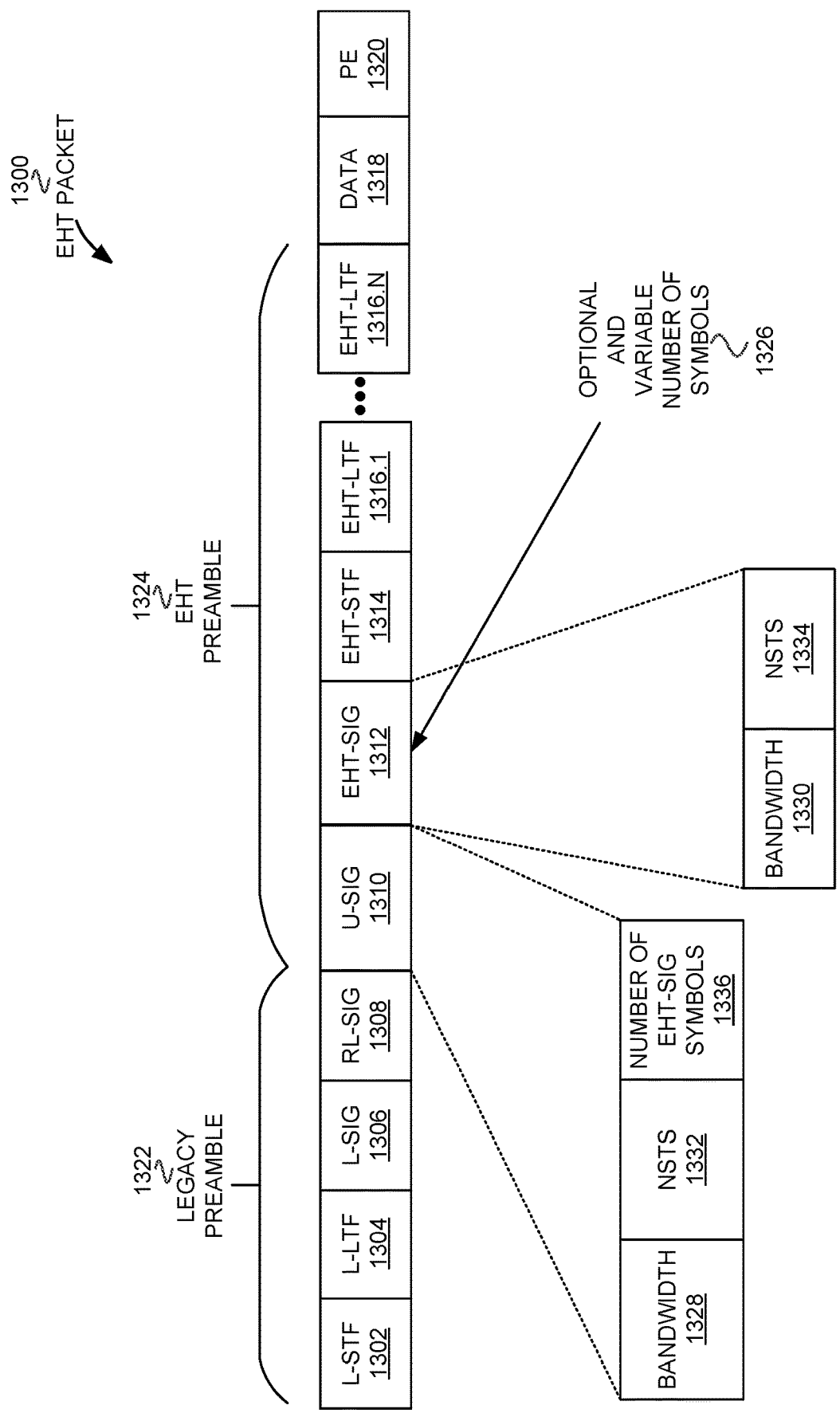
FIG. 13 illustrates an EHT physical layer (PHY) protocol data unit (PPDU), in accordance with some embodiments.

FIG. 13 illustrates an EHT physical layer (PHY) protocol data unit (PPDU) 1300, in accordance with some embodiments. Illustrated in FIG. 13 is EHT PPDU 1300, which includes one or more of the following fields. L-STF 1302, L-LTF 1304, L-SIG 1306, RL-SIG 1308, U-SIG 1310, EHT-SIG 1312, EHT-STF 1314, EHT-LTF 1316.1 through EHT-LTF 1316.N, data 1318, PE 1320, legacy preamble 1322, and EHT preamble 1324. EHT PPDU 1300 may have different formats, e.g., EHT single user (SU) PPDU, EHT multi-user (MU) PPDU, EHT extended range (ER) SU PPDU, and/or EHT trigger-based (TB) PPDU. The different formats may have different fields and/or different formats of the same fields. For example, EHT-SIG 1312 may be optional and may have a variable number of symbols 1326. Some frame formats may have U-SIG fields 1310 that are a different number of symbols.

In some embodiments, U-SIG 1310 and EHT-SIG 1312 may include a bandwidth field 1328 and bandwidth 1330, respectively. Bandwidth field 1328 and bandwidth 1330 may include bits to support indicating a bandwidth of up to a 320 MHz channel width. In some embodiments, up to a 320 MHz channel width is supported and 16 spatial streams are supported by the following fields. In some embodiments, U-SIG 1310 includes number space-time streams (NSTS) field 1332. In some embodiments, EHT-SIG 1312 includes NSTS field 1334. In some embodiments, U-SIG 1310 includes number of HE-SIG symbols field 1336.

In some embodiments, bandwidth field 1328 includes bits to indicate 20/40/80/160 MHz and the preamble puncturing for 80 MHz and 160 MHz in HE MU PPDU. In order to support one more bandwidth, which is 320 MHz, repurpose the preamble puncturing pattern in current IEEE 802.11ax to indicate 320 MHz channel width. There are currently 4 preamble puncturing patterns for 80 MHz and 160 MHz. one or more of the puncturing patters is repurposed to indicate 320 MHz or repurpose more than one to indicate 320 MHz channel width plus 320 MHz channel width with preamble puncturing.

In some embodiments, bandwidth field 1328 is 4 bits. Table 3 indicates for an EHT MU PPDU a value of the bandwidth field 1328 and the indicated bandwidth. The bandwidth for values 8-15 may be different, but at least one of the values indicates 320 bandwidth with non-preamble puncturing mode.

In some embodiments, the values 8-15 may indicate one or more of the following: 280 (160+120 and 140+140), 260 (140+120 and 160+100), 240 (160+80), 200 (120+80 and 160+40), 320, and/or 180 (120+60 and 140+40).

TABLE 3

Bandwidth Field for EHT MU PPDU

| VALUE | Bandwidth |
|---|---|
| 0 | 20 MHz non-preamble puncturing mode |
| 1 | 40 MHz non-preamble puncturing mode |
| 2 | 80 MHz non-preamble puncturing mode |
| 3 | 160 MHz and 80 + 80 MHz non-preamble puncturing mode |
| 4 | preamble puncturing in 80 MHz, where in the preamble only the secondary 20 MHz is punctured. |
| 5 | preamble puncturing in 80 MHz, where in the preamble only one of the two 20 MHz sub-channels in secondary 40 MHz is punctured |
| 6 | preamble puncturing in 160 MHz or 80 + 80 MHz, where in the primary 80 MHz of the preamble only the secondary 20 MHz is punctured |
| 7 | preamble puncturing in 160 MHz or 80 + 80 MHz, where in the primary 80 MHz of the preamble the primary 40 MHz is present. |
| 8 | 320 MHz non-preamble puncturing mode |
| 9 | preamble puncturing mode |
| 10 | preamble puncturing mode |
| 11 | preamble puncturing mode |
| 12 | preamble puncturing mode |

TABLE 3-continued

Bandwidth Field for EHT MU PPDU

| VALUE | Bandwidth |
|---|---|
| 13 | preamble puncturing mode |
| 14 | preamble puncturing mode |
| 15 | preamble puncturing mode |

Table 4 indicates values for bandwidth field 1328 with 3 bits for EHT PPDUs with a different type than that for Table 3. For example, the PPDUs may be EHT SU PPDU, EHT ER SU PPDU, and/or EHT TB PPDU. At least one of the bit values from 4 to 7 indicates a bandwidth of 320 MHz. Table 3 and Table 4 may be for different format PPDUs.

TABLE 4

Bandwidth Field for EHT SU PPDU and EHT ER SU PPDU

| Value | Bandwidth |
|---|---|
| 0 | 20 MHz |
| 1 | 40 MHz |
| 2 | 80 MHz |
| 3 | 160 MHz and 80 MHz + 80 MHz |
| 4 | 320 MHz |
| 5 | 320 MHz |
| 6 | 320 MHz |
| 7 | 320 MHz |

In some embodiments, NSTS field 1332 indicates for some PPDU formats, e.g., EHT SU PPDU, 4 bits to indicate up to 16 spatial streams.

In some embodiments, NSTS field 1334 indicates for some PPDU formats, e.g., EHT MU PPDU, 4 bits to indicate up to 16 spatial streams. In some embodiments, the value of NSTS fields 1332, 1334 is set to the number of space-time streams minus 1.

In some embodiments, number of EHT-SIG symbols field 1336 is greater than 4 bits to indicate more than 16 OFDM symbols in EHT-SIG field 1312. In some embodiments, a number of clients, e.g., EHT STAB 504, is multiplied together in the frequency domain for 320 MHz channel width. Since every two clients are encoded together in the user field in EHT-SIG 1312 more clients means the EHT-SIG field 1312 needs more than 16 OFDM symbols. In some embodiments, number of EVT-SIG symbols field 1336 is 6 bits to indicate up to 64 OFDM symbols. In some embodiments, a different number of bits is used, e.g., 7 for 128, 8 for 256, etc.

In some embodiments, number of EVT-SIG symbols field 1336 is 4 bits and indexed to indicate more than 16 OFDM. For example, 1, 2, 3, 4 OFDM symbols may not be possible for 320 MHz channels due to the bulky common info field in EVT-SIG 1312. In some embodiments, EHT-SIG 1312 is used to indicate RUs for DL data and for the downlink data. In some embodiments, the number indicated by the value of number of EVT-SIG symbols field 1336 is N through N+15, where N is the minimum number of EVT-SIG symbols 1336, e.g. 8 or 12, or even configurable or based on the bandwidth 1328. In some embodiments, values of number of EVT-SIG symbols 1336 may be for some values larger than the value, e.g., four entries, 1, 2, 3, 4, to be a large value such as the four entries corresponding to 1, 2, 3, 4 OFDM symbols could be repurposed as 20, 32, 40, 64 OFDM symbols.

Packet extension (PE) 1320 is used to gain processing time at the receiver of the EHT PPDU 1300. EHT PPDUs 1300 with 320 MHz bandwidth and 16 spatial streams means more processing load for the hardware of the receiver of the EHT PPDU 1300. Table 5 illustrates durations for PE 1320, including durations for 320 MHz EHT PPDUs. Table 5 supports more than 16 us PE 1320 durations for a 320 MHz channel. M μs is the maximum PE 1320 value which is determined from the MAC layer. U-SIG 1310 indicates a value which determine the exact packet extension length together with the nominal packet extension value from MAC layer. For example, if the MAC layer determines the nominal value for packet extension is m μs and U-SIG 1310 indicate a=2, the exact packet extension length will be m−8 us. In some embodiments, m is larger than 16, e.g., a number between 20 and 32, or another number greater than 32.

TABLE 5

Table for Packet Extension

TXVECTOR parameter NOMINAL_PACKET_PADDING (HE SU PPDU or HE ER SU PPDU) or NOMINAL_PACKET_PADDING [u] (HE MU PPDU)

| | | | | |
|---|---|---|---|---|
| a | 0 μs | 8 μs | 16 μs | m μs |
| 1 | 0 μs | 0 μs | 4 μs | m-12 μs |
| 2 | 0 μs | 0 μs | 8 μs | m-8 μs |
| 3 | 0 μs | 4 μs | 12 μs | m-4 μs |
| 4 | 0 μs | 8 μs | 16 μs | m μs |

In some embodiments, EHT-SIG 1312 indicates DL RUs for EHT STAs 504 to receive data from an EHT AP 502. The DL RUs include spatial configurations for MU-MIMO, which may include up to 16 spatial streams. In IEEE 802.11ax HE MU PPDU, if a RU is used for MU-MIMO transmission, the spatial configuration for each STA is indicated by the spatial configuration field in HE-SIGB user field. For each STA, the spatial configuration field indicate an entry in this table, such that the STA could derive the spatial stream index to process and the total number of streams in the current PPDU. For example, if Nuser=4, and spatial confirmation field indicate 1010, the 2nd STA in the PPDU will parse the 3rd and 4th streams of eight stream, which are for the 2nd STA.

In some embodiments, a maximum number of spatial streams for each STA is four. In some embodiments, the number of streams for the users is non-increasing across users in a MU-MIMO PPDU. Namely, Nsts[1]≥Nsts[2]≥ . . . ≥Nsts[Nuser]. Nuser is the total number of users paired in the MU-MIMO.

Tables 6-8 are example for different number of users (Nuser) in the EHT MU-MIMO PPDU. Six (6) users multiplexed in the EHT MU-MIMO PPDU (Nuser=6) requires the largest number, 54, of entries to indicate the spatial configurations compared with other Nuser values. To indicate up to 54 spatial stream configurations requires 6 bits. Tables 6-8 are example table that illustrate the number of bits needed in the RU allocation subfield to indicate a number of spatial streams for each of the users.

Table 6 illustrates number of entries (35) for 4 number of users (Nusers) with 16 total N spatial streams (Nsts). MU-MIMO is used to transmit data to the 4 users and the number of entries indicates the different possibilities combinations of spatial streams.

TABLE 6

Number of Entries for 4 users and 16 spatial streams.

| Nuser | Nsts[1] | Nsts[2] | Nsts[3] | Nsts[4] | Total Nsts | Number of entries |
|---|---|---|---|---|---|---|
| 4 | 1 | 1 | 1 | 1 | 4 | 35 |
|   | 2 | 1 | 1 | 1 | 5 |   |
|   | 2 | 2 | 1 | 1 | 6 |   |
|   | 2 | 2 | 2 | 1 | 7 |   |
|   | 2 | 2 | 2 | 2 | 8 |   |
|   | 3 | 1 | 1 | 1 | 6 |   |
|   | 3 | 2 | 1 | 1 | 7 |   |
|   | 3 | 2 | 2 | 1 | 8 |   |
|   | 3 | 2 | 2 | 2 | 9 |   |
|   | 3 | 3 | 1 | 1 | 8 |   |
|   | 3 | 3 | 2 | 1 | 9 |   |
|   | 3 | 3 | 2 | 2 | 10 |   |
|   | 3 | 3 | 3 | 1 | 10 |   |
|   | 3 | 3 | 3 | 2 | 11 |   |
|   | 3 | 3 | 3 | 3 | 12 |   |
|   | 4 | 1 | 1 | 1 | 7 |   |
|   | 4 | 2 | 1 | 1 | 8 |   |
|   | 4 | 2 | 2 | 1 | 9 |   |
|   | 4 | 2 | 2 | 2 | 10 |   |
|   | 4 | 3 | 1 | 1 | 9 |   |
|   | 4 | 3 | 2 | 1 | 10 |   |
|   | 4 | 3 | 2 | 2 | 11 |   |
|   | 4 | 3 | 3 | 1 | 11 |   |
|   | 4 | 3 | 3 | 2 | 12 |   |
|   | 4 | 3 | 3 | 3 | 13 |   |
|   | 4 | 4 | 1 | 1 | 10 |   |
|   | 4 | 4 | 2 | 1 | 11 |   |
|   | 4 | 4 | 2 | 2 | 12 |   |
|   | 4 | 4 | 3 | 1 | 12 |   |
|   | 4 | 4 | 3 | 2 | 13 |   |
|   | 4 | 4 | 3 | 3 | 14 |   |
|   | 4 | 4 | 4 | 1 | 13 |   |
|   | 4 | 4 | 4 | 2 | 14 |   |
|   | 4 | 4 | 4 | 3 | 15 |   |
|   | 4 | 4 | 4 | 4 | 16 |   |

Table 7 illustrates number of entries (49) for 5 number of users (Nusers) with 16 total N spatial streams (Nsts). MU-MIMO is used to transmit data to the 5 users and the number of entries indicates the different possibilities combinations of spatial streams.

TABLE 7

Number of Entries for 4 users and 16 spatial streams.

| Nuser | Nsts[1] | Nsts[2] | Nsts[3] | Nsts[4] | Nsts[5] | Total Nsts | Number of entries |
|---|---|---|---|---|---|---|---|
| 5 | 3 | 3 | 2 | 1 | 1 | — | 49 |
|   | 3 | 3 | 2 | 2 | 1 | 5 |   |
|   | 3 | 3 | 2 | 2 | 2 | 6 |   |
|   | 3 | 3 | 3 | 1 | 1 | 7 |   |
|   | 3 | 3 | 3 | 2 | 1 | 8 |   |
|   | 3 | 3 | 3 | 2 | 2 | 9 |   |
|   | 3 | 3 | 3 | 3 | 1 | 10 |   |
|   | 3 | 3 | 3 | 3 | 2 | 7 |   |
|   | 3 | 3 | 3 | 3 | 3 | 8 |   |
|   | 4 | 1 | 1 | 1 | 1 | 9 |   |
|   | 4 | 2 | 1 | 1 | 1 | 10 |   |
|   | 4 | 2 | 2 | 1 | 1 | 11 |   |
|   | 4 | 2 | 2 | 2 | 1 | 9 |   |
|   | 4 | 2 | 2 | 2 | 2 | 10 |   |
|   | 4 | 3 | 1 | 1 | 1 | 11 |   |
|   | 4 | 3 | 2 | 1 | 1 | 12 |   |
|   | 4 | 3 | 2 | 2 | 1 | 11 |   |
|   | 4 | 3 | 2 | 2 | 2 | 12 |   |
|   | 4 | 3 | 3 | 1 | 1 | 13 |   |
|   | 4 | 3 | 3 | 2 | 1 | 13 |   |
|   | 4 | 3 | 3 | 2 | 2 | 14 |   |
|   | 4 | 3 | 3 | 3 | 1 | 15 |   |
|   | 4 | 3 | 3 | 3 | 2 | 8 |   |

TABLE 7-continued

Number of Entries for 4 users and 16 spatial streams.

| Nuser | Nsts[1] | Nsts[2] | Nsts[3] | Nsts[4] | Nsts[5] | Total Nsts | Number of entries |
|---|---|---|---|---|---|---|---|
| 4 | 3 | 3 | 3 | 3 | 3 | 9 |   |
| 4 | 4 | 1 | 1 | 1 | 1 | 10 |   |
| 4 | 4 | 2 | 1 | 1 | 1 | 11 |   |
| 4 | 4 | 2 | 2 | 1 | 1 | 12 |   |
| 4 | 4 | 2 | 2 | 2 | 2 | 10 |   |
| 4 | 4 | 3 | 1 | 1 | 1 | 11 |   |
| 4 | 4 | 3 | 2 | 1 | 1 | 12 |   |
| 4 | 4 | 3 | 2 | 2 | 1 | 13 |   |
| 4 | 4 | 3 | 3 | 1 | 1 | 12 |   |
| 4 | 4 | 3 | 3 | 2 | 1 | 13 |   |
| 4 | 4 | 4 | 1 | 1 | 1 | 14 |   |
| 4 | 4 | 4 | 2 | 1 | 1 | 14 |   |
| 4 | 4 | 4 | 2 | 2 | 1 | 15 |   |
| 4 | 4 | 4 | 3 | 1 | 1 | 16 |   |
| 3 | 3 | 2 | 1 | 1 | 1 | 11 |   |
| 3 | 3 | 2 | 2 | 1 | 1 | 12 |   |
| 3 | 3 | 2 | 2 | 2 | 2 | 13 |   |
| 3 | 3 | 3 | 1 | 1 | 1 | 14 |   |
| 3 | 3 | 3 | 2 | 1 | 1 | 13 |   |
| 3 | 3 | 3 | 2 | 2 | 2 | 14 |   |
| 3 | 3 | 3 | 3 | 1 | 1 | 15 |   |
| 3 | 3 | 3 | 3 | 2 | 2 | 15 |   |
| 3 | 3 | 3 | 3 | 3 | 3 | 16 |   |
| 4 | 1 | 1 | 1 | 1 | 1 | 14 |   |
| 4 | 2 | 1 | 1 | 1 | 1 | 15 |   |
| 4 | 2 | 2 | 1 | 1 | 1 | 16 |   |

Table 8 illustrates number of entries (54) for 6 number of users (Nusers) with 16 total N spatial streams (Nsts). MU-MIMO is used to transmit data to the 5 users and the number of entries indicates the different possibilities combinations of spatial streams.

TABLE 8

Number of Entries for 6 users and 16 spatial streams.

| Nuser | Nsts[1] | Nsts[2] | Nsts[3] | Nsts[4] | Nsts[5] | Nsts[6] | Total Nsts | Number of entries |
|---|---|---|---|---|---|---|---|---|
| 6 | 1 | 1 | 1 | 1 | 1 | 1 | 6 | 54 |
|   | 2 | 1 | 1 | 1 | 1 | 1 | 7 |   |
|   | 2 | 2 | 1 | 1 | 1 | 1 | 8 |   |
|   | 2 | 2 | 2 | 1 | 1 | 1 | 9 |   |
|   | 2 | 2 | 2 | 2 | 1 | 1 | 10 |   |
|   | 2 | 2 | 2 | 2 | 2 | 1 | 11 |   |
|   | 2 | 2 | 2 | 2 | 2 | 2 | 12 |   |
|   | 3 | 1 | 1 | 1 | 1 | 1 | 8 |   |
|   | 3 | 2 | 1 | 1 | 1 | 1 | 9 |   |
|   | 3 | 2 | 2 | 1 | 1 | 1 | 10 |   |
|   | 3 | 2 | 2 | 2 | 1 | 1 | 11 |   |
|   | 3 | 2 | 2 | 2 | 2 | 1 | 12 |   |
|   | 3 | 2 | 2 | 2 | 2 | 2 | 13 |   |
|   | 3 | 3 | 1 | 1 | 1 | 1 | 10 |   |
|   | 3 | 3 | 2 | 1 | 1 | 1 | 11 |   |
|   | 3 | 3 | 2 | 2 | 1 | 1 | 12 |   |
|   | 3 | 3 | 2 | 2 | 2 | 1 | 13 |   |
|   | 3 | 3 | 2 | 2 | 2 | 2 | 14 |   |
|   | 3 | 3 | 3 | 1 | 1 | 1 | 12 |   |
|   | 3 | 3 | 3 | 2 | 1 | 1 | 13 |   |
|   | 3 | 3 | 3 | 2 | 2 | 1 | 14 |   |
|   | 3 | 3 | 3 | 2 | 2 | 2 | 15 |   |
|   | 3 | 3 | 3 | 3 | 1 | 1 | 14 |   |
|   | 3 | 3 | 3 | 3 | 2 | 1 | 15 |   |
|   | 3 | 3 | 3 | 3 | 2 | 2 | 16 |   |
|   | 3 | 3 | 3 | 3 | 3 | 1 | 16 |   |
|   | 4 | 1 | 1 | 1 | 1 | 1 | 9 |   |
|   | 4 | 2 | 1 | 1 | 1 | 1 | 10 |   |
|   | 4 | 2 | 2 | 1 | 1 | 1 | 11 |   |
|   | 4 | 2 | 2 | 2 | 1 | 1 | 12 |   |
|   | 4 | 2 | 2 | 2 | 2 | 1 | 13 |   |

TABLE 8-continued

Number of Entries for 6 users and 16 spatial streams.

| Nuser | Nsts [1] | Nsts [2] | Nsts [3] | Nsts [4] | Nsts [5] | Nsts [6] | Total Nsts | Number of entries |
|---|---|---|---|---|---|---|---|---|
| 4 | 2 | 2 | 2 | 2 | 2 | | 14 | |
| 4 | 3 | 1 | 1 | 1 | 1 | | 11 | |
| 4 | 3 | 2 | 1 | 1 | 1 | | 12 | |
| 4 | 3 | 2 | 2 | 1 | 1 | | 13 | |
| 4 | 3 | 2 | 2 | 2 | 1 | | 14 | |
| 4 | 3 | 2 | 2 | 2 | 2 | | 15 | |
| 4 | 3 | 3 | 1 | 1 | 1 | | 13 | |
| 4 | 3 | 3 | 2 | 1 | 1 | | 14 | |
| 4 | 3 | 3 | 2 | 2 | 1 | | 15 | |
| 4 | 3 | 3 | 2 | 2 | 2 | | 16 | |
| 4 | 3 | 3 | 3 | 1 | 1 | | 15 | |
| 4 | 3 | 3 | 3 | 2 | 1 | | 16 | |
| 4 | 4 | 1 | 1 | 1 | 1 | | 12 | |
| 4 | 4 | 2 | 1 | 1 | 1 | | 13 | |
| 4 | 4 | 2 | 2 | 1 | 1 | | 14 | |
| 4 | 4 | 2 | 2 | 2 | 1 | | 15 | |
| 4 | 4 | 2 | 2 | 2 | 2 | | 16 | |
| 4 | 4 | 3 | 1 | 1 | 1 | | 14 | |
| 4 | 4 | 3 | 2 | 1 | 1 | | 15 | |
| 4 | 4 | 3 | 2 | 2 | 1 | | 16 | |
| 4 | 4 | 3 | 3 | 1 | 1 | | 16 | |
| 4 | 4 | 4 | 1 | 1 | 1 | | 15 | |
| 4 | 4 | 4 | 2 | 1 | 1 | | 16 | |

Figure 14:
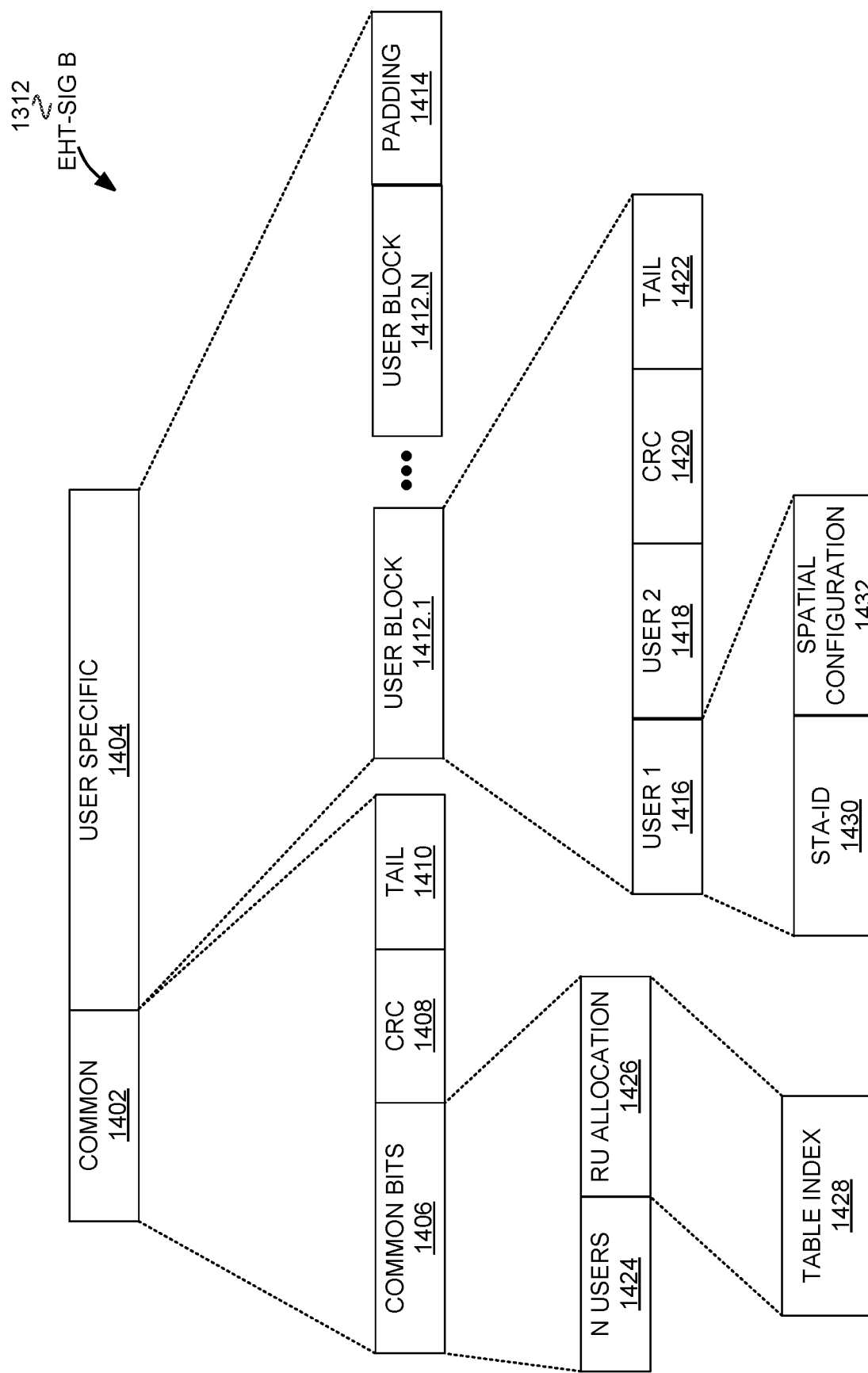
FIG. 14 illustrates an EHT-SIG, in accordance with some embodiments.

FIG. 14 illustrates an EHT-SIG 1312, in accordance with some embodiments. Illustrated in FIG. 14 is common field 1402 and user specific field 1404. The common field 1402 includes common bits field 1406, CRC 1408, and tail field 1410. The common bits field 1406 includes N users 1424 and RU allocation 1426. The N users 1424 indicates a number of users (e.g., EHT STAs 504) are indicated in the EHT-SIG 1312. The RU allocation 1426 indicates an table index 1428 into a table where the index indicates a combination of frequency RUs and spatial allocations per each frequency RU. In some embodiments, the first portion of the index indicates an arrangement of frequency RUs and the second portion of the index indicates a number of spatial streams per frequency RU.

The user specific field 1404 includes user block 1412.1 through 1412.N and padding field 1414. The user blocks 1412 include user 1 1416, user 2 1418, CRC field 1420, and tail field 1422. The user fields, e.g., user 1 1416, user 2 1418, etc., include STA-ID 1430 and spatial configuration 1432. Spatial configuration 1432 is 6 bits in accordance with some embodiments. Spatial configuration 1432 is an index into a table such as Tables 6-8, where the table is indexed by the number of N users 1424 and user determines the number and placement of the spatial streams based on their position within the user specific field 1404. For example, referring to Table 8 so that there are 6 users and the user is the second user in the user specific field 1404, e.g., user 2 1418, and the spatial configuration 1432 indicated the third row of Table 8, then the user would be allocated 2 spatial streams, which would be the $3^{rd}$ and $4^{th}$ spatial stream. The frequency RU is determined by the user from the table index field 1428, which indicates a combination of frequency RUs with a number of user per RU. The user can then determine their frequency RU based on their position within user specific field 1404, e.g., a row of the table might look like 106 tones (6 users), 52 tones, and 52 tones. The user may be the second user of user specific field 1404 so that the frequency RU is the 106 tones. The user can then determine their spatial stream allocation based on the spatial configuration, e.g., if the spatial configure field 1432 indicated the third row of Table 8, e.g., 000011, then the user would use spatial stream 3 and 4 of the 106 tone frequency RU.

The EHT-SIG 1312 is part of an EHT MU MIMO PPDU where the RUs for N users, e.g., as indicated by N users 1424, is indicated by the EHT-SIG and then the data is transmitted in accordance with the RU.

Figure 15:
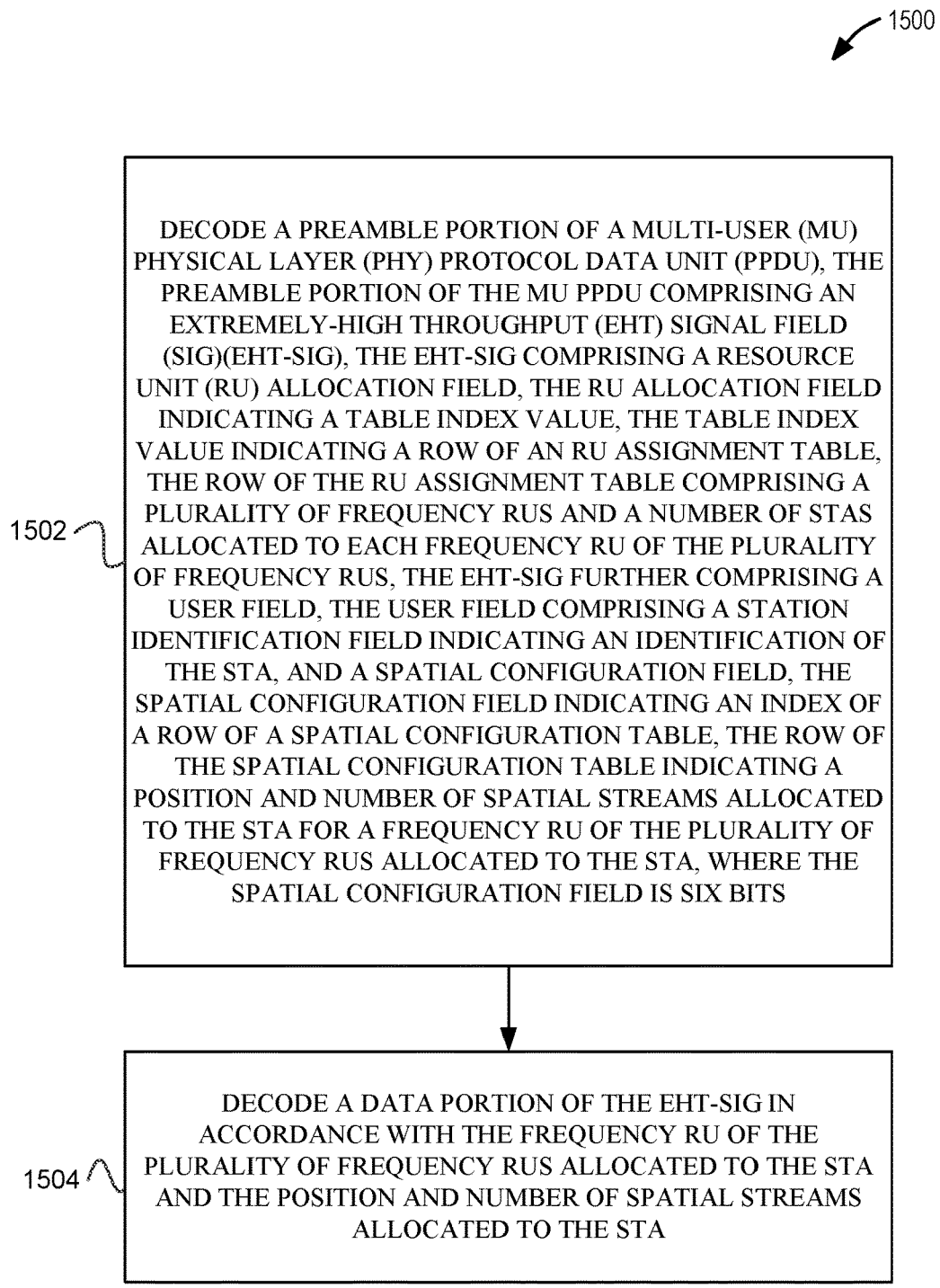
FIG. 15 illustrates a method for signaling downlink (DL) data resource, in accordance with some embodiments.

FIG. 15 illustrates a method 1500 for signaling downlink (DL) data resource, in accordance with some embodiments. The method 1500 begins at operation 1502 with decoding a preamble portion of a MU PPDU, the preamble portion of the MU PPDU comprising an EHT-SIG, the EHT-SIG comprising a RU allocation field, the RU allocation field indicating a table index value, the table index value indicating a row of an RU assignment table, the row of the RU assignment table comprising a plurality of frequency RUs and a number of STAs allocated to each frequency RU of the plurality of frequency RUs, the EHT-SIG further comprising a user field, the user field comprising a station identification field indicating an identification of the STA, and a spatial configuration field, the spatial configuration field indicating an index of a row of a spatial configuration table, the row of the spatial configuration table indicating a position and number of spatial streams allocated to the STA for a frequency RU of the plurality of frequency RUs allocated to the STA, wherein the spatial configuration field is six bits.

For example, as disclosed in conjunction with FIG. 14, a EHT STA 504 may decode EHT-SIG B 1312, which includes the table index 1428, STA-ID 1430, and spatial configuration 1432.

The method 1500 continues at operation 1504 with decoding a data portion of the EHT-SIG in accordance with the frequency RU of the plurality of frequency RUs allocated to the STA and the position and number of spatial streams allocated to the STA. As disclosed in conjunction with FIG. 14, a EHT STA 504 may decode a data portion of the EHT-SIG.

The method 1500 may be performed by an EHT STA 504, an EHT AP 502, an apparatus of an EHT STA 504, an apparatus of a EHT AP 502, in accordance with some embodiments. Method 1500 may include one or more additional operations. One or more operations of method 1500 may be optional. One or more of the operations may be performed in a different order than illustrated. The terms EHT and IEEE 802.11be may be used interchangeably in accordance with some embodiments.

Figure 16:
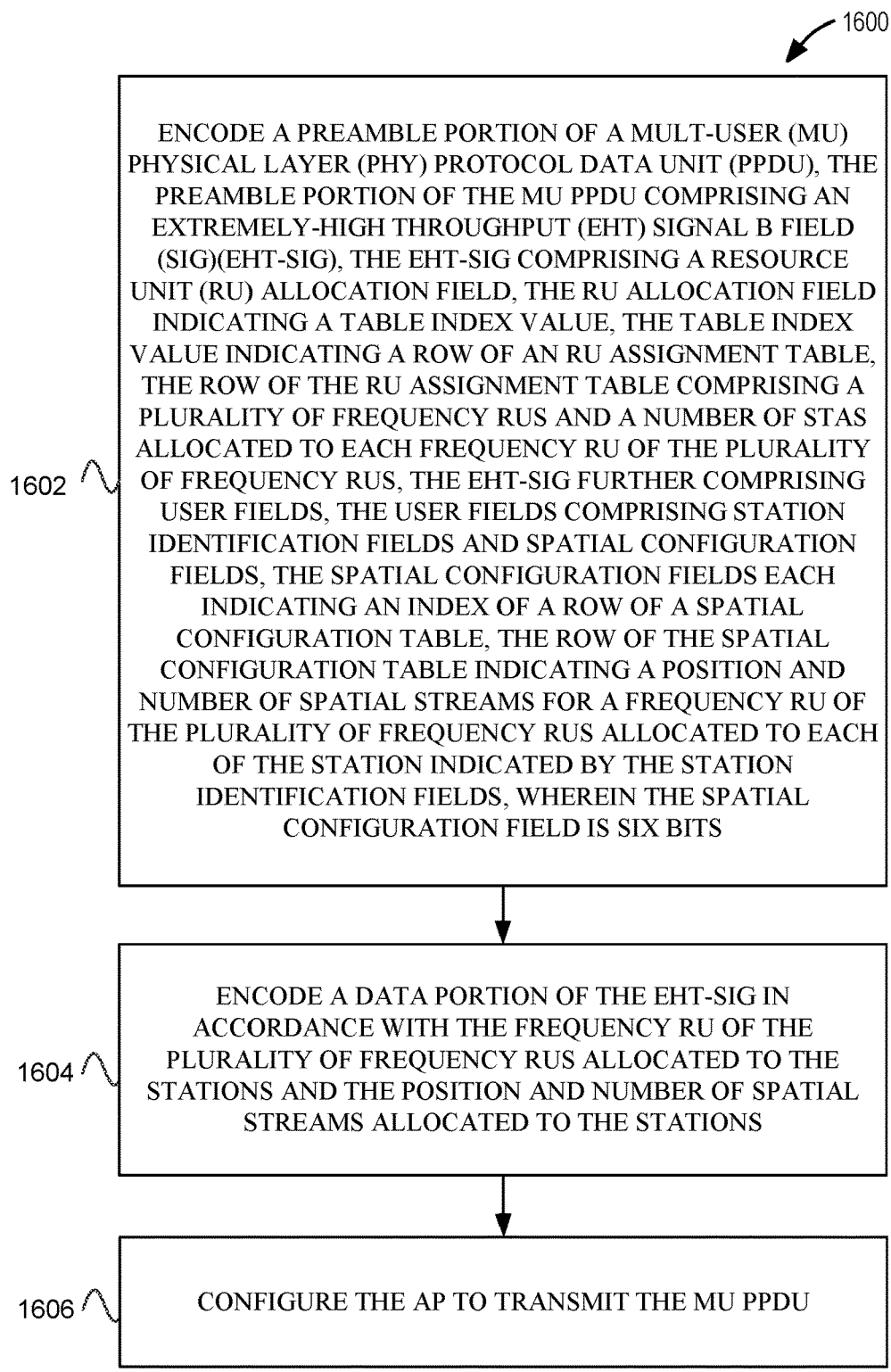
FIG. 16 illustrates a method for signaling DL data resource, in accordance with some embodiments.

FIG. 16 illustrates a method 1600 for signaling DL data resource, in accordance with some embodiments. The method 1600 begins at operation 1602 with encoding a preamble portion of a MU PPDU, the preamble portion of the MU PPDU comprising an EHT-SIG, the EHT-SIG comprising a RU allocation field, the RU allocation field indicating a table index value, the table index value indicating a row of an RU assignment table, the row of the RU assignment table comprising a plurality of frequency RUs and a number of STAs allocated to each frequency RU of the plurality of frequency RUs, the EHT-SIG further comprising user fields, the user fields comprising station identification fields and spatial configuration fields, the spatial configuration fields each indicating an index of a row of a spatial configuration table, the row of the spatial configuration table indicating a position and number of spatial streams for a frequency RU of the plurality of frequency RUs allocated to each of the station indicated by the station identification fields, wherein the spatial configuration field is six bits.

As disclosed in conjunction with FIG. 14, an EHT AP 502 may encode an EVT-SIG 1312 to include table index 1428 and user blocks 1412. The method 1600 continues at operation 1604 with encoding a data portion of the EHT-SIG in accordance with the frequency RU of the plurality of frequency RUs allocated to the stations and the position and number of spatial streams allocated to the stations. For example, as disclosed in conjunction with FIG. 14 an EHT AP 502 may encode a data portion of the EHT-SIG 1312 in accordance with the common field 1402 and user specific field 1404.

The method 1600 continues at operation 1606 with configuring the AP to transmit the MU PPDU. For example, an EHT AP 502 may transmit a EHT packet 1300.

The method 1600 may be performed by an EHT STA 504, an EHT AP 502, an apparatus of an EHT STA 504, an apparatus of a EHT AP 502, in accordance with some embodiments. Method 1600 may include one or more additional operations. One or more operations of method 1600 may be optional. One or more of the operations may be performed in a different order than illustrated.

Figure 17:
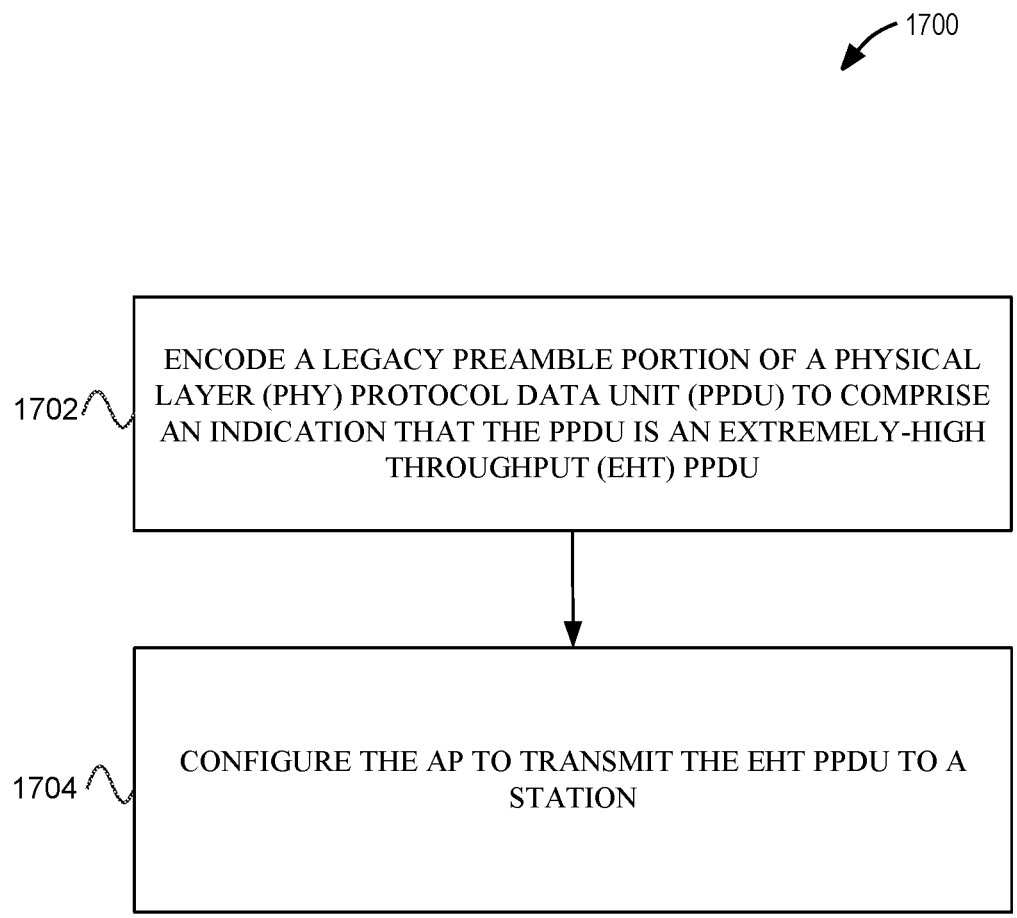
FIG. 17 illustrates a method for signaling a packet is a EHT packet, in accordance with some embodiments.

FIG. 17 illustrates a method 1700 for signaling a packet is a EHT packet, in accordance with some embodiments. Method 1700 begins at operation 1702 with encoding a legacy preamble portion of a PPDU to comprise an indication that the PPDU is an EHT PPDU. For example, an EHT STA 504 and/or EHT AP 502 may encode EHT packet 800, 900, and/or 1200 to include indication of EHT 812, 912. The method 1700 continues at operation 1704 with configuring the AP to transmit the EHT PPDU to a station. For example, an EHT AP 502 may be configured by an apparatus to transmit the EHT packet 800, 900, and/or 1200.

The method 1700 may be performed by an EHT STA 504, an EHT AP 502, an apparatus of an EHT STA 504, an apparatus of a EHT AP 502, in accordance with some embodiments. Method 1700 may include one or more additional operations. One or more operations of method 1700 may be optional. One or more of the operations may be performed in a different order than illustrated.

Figure 18:
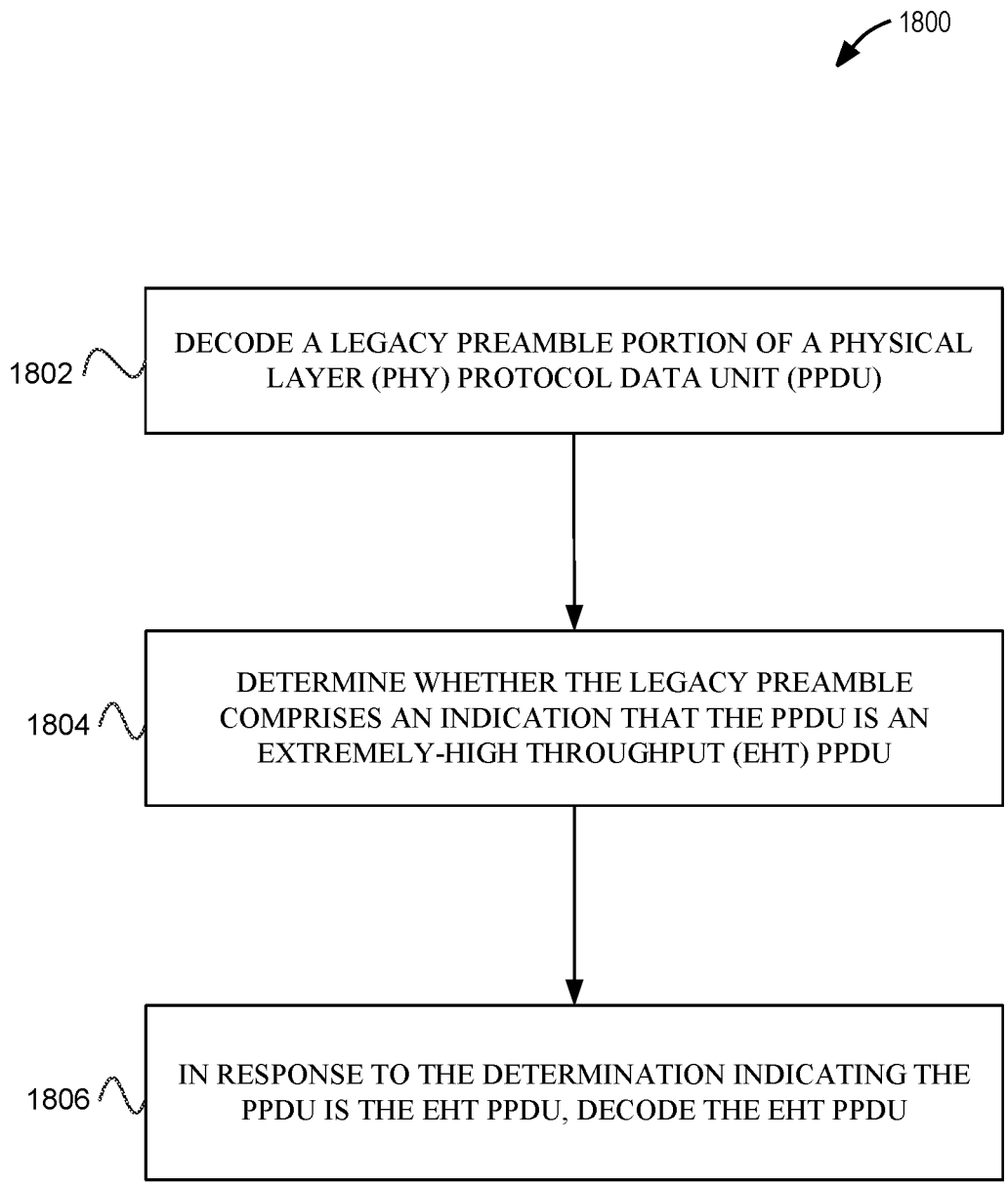
FIG. 18 illustrates a method for signaling a packet is a EHT packet, in accordance with some embodiments.

FIG. 18 illustrates a method 1800 for signaling a packet is a EHT packet, in accordance with some embodiments. The method 1800 begins at operation 1802 with decoding a legacy preamble portion of a PPDU. For example, an EHT AP 502 and/or EHT STA 504 may decode legacy preamble 830, 930, 1224.

The method continues at operation 1804 with determining whether the legacy preamble comprises an indication that the PPDU is an EHT PPDU. For example, an EHT AP 502 and/or EHT STA 504 may determine whether the EHT packet 800, 900, 1200, includes indication of EHT 812.1, 912.1.

The method continues at operation 1806 with in response to the determination indicating the PPDU is the EHT PPDU, decoding the EHT PPDU. For example, an EHT AP 502 and/or EHT STA 504 may decode the EHT packet 800, 900, 1200, if the indication of EHT 812.1, 912.1 is detected.

The method 1800 may be performed by an EHT STA 504, an EHT AP 502, an apparatus of an EHT STA 504, an apparatus of a EHT AP 502, in accordance with some embodiments. Method 1800 may include one or more additional operations. One or more operations of method 1800 may be optional. One or more of the operations may be performed in a different order than illustrated.

Example 1 is an apparatus of a station, the apparatus comprising memory; and processing circuitry coupled to the memory, the processing circuity configured to: decode a legacy preamble portion of a physical layer (PHY) protocol data unit (PPDU); determine whether the legacy preamble comprises an indication that the PPDU is an EHT PPDU; and in response to the determination indicating the PPDU is the EHT PPDU, decode the EHT PPDU.

In Example 2, the subject matter of Example 1 includes, wherein the legacy preamble comprises a L-SIG and a RL-SIG, and wherein the processing circuitry is further configured to: determine the legacy preamble comprises the indication that the PPDU is the EHT PPDU when the RL-SIG is the L-SIG negated.

In Example 3, the subject matter of Examples 1-2 includes, wherein the L-SIG and the RL-SIG comprise a rate field, and wherein the processing circuitry is further configured to: determine a packet type of the EHT PPDU based on a value of the rate field.

In Example 4, the subject matter of Example 3 includes, where the processing circuitry is further configured to: decode the EHT PPDU based on the packet type. In Example 5, the subject matter of Examples 3-4 includes, Mb/s. In Example 6, the subject matter of Examples 1-5 includes, wherein the processing circuitry is further configured to: determine whether a symbol after the RL-SIG comprises a backup indication that the PPDU is the EHT PPDU, wherein the symbol comprises the backup indication when the symbol was transmitted in accordance with Quadrature Binary phase shift keying (QBPSK).

In Example 7, the subject matter of Examples 1-6 includes, wherein the L-SIG comprises a length field, and wherein the processing circuitry is further configured to: determine a duration of the PPDU based on a value indicated by the length field and the value indicated by the rate field.

In Example 8, the subject matter of Examples 1-7 includes, wherein the processing circuitry is further configured to: in response to the determination indicating the PPDU is not the EHT PPDU, deferring for a duration based on a value indicated by a length field of the L-SIG and a rate field of the L-SIG.

In Example 9, the subject matter of Examples 1-8 includes, wherein before the L-SIG, the PPDU further comprises a legacy short-training (L-STF) and a legacy long-training field (L-LTF).

In Example 10, the subject matter of Examples 1-9 includes, MHz channel of a bandwidth, and wherein one or more symbols after the RL-SIG are transmitted across the bandwidth.

In Example 11, the subject matter of Examples 1-10 includes, synthesizer, the synthesizer circuitry configured to generate an output frequency for use by the mixer circuitry, wherein the processing circuitry is configured to decode the baseband signals, the baseband signals including the PPDU.

In Example 12, the subject matter of Examples 1-11 includes, mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the PPDU.

Example 13 is a non-transitory computer-readable storage medium that stores instructions for execution by one or more processors of an apparatus of a station (STA), the instructions to configure the one or more processors to: decode a legacy preamble portion of a physical layer (PHY) protocol data unit (PPDU); determine whether the legacy preamble comprises an indication that the PPDU is an extremely-high throughput (EHT) PPDU; and in response to the determination indicating the PPDU is the EHT PPDU, decode the EHT PPDU.

In Example 14, the subject matter of Example 13 includes, wherein the legacy preamble comprises a legacy signal field (L-SIG) and a repeated L-SIG (RL-SIG), and wherein the instructions further configure the one or more processors to: determine the legacy preamble comprises the indication that the PPDU is the EHT PPDU when the RL-SIG is the L-SIG negated.

Example 15 is an apparatus of an access point (AP), the apparatus comprising memory; and processing circuitry coupled to the memory, the processing circuity configured to: encode a legacy preamble portion of a physical layer (PHY) protocol data unit (PPDU) to comprise an indication that the PPDU is an extremely-high throughput (EHT) PPDU; and configure the AP to transmit the EHT PPDU to a station.

In Example 16, the subject matter of Example 15 includes, wherein the processing circuitry is further configured to: encode the legacy preamble to comprise the indication that the PPDU is the EHT PPDU by encoding a legacy signal field (L-SIG) and a repeated L-SIG (RL-SIG), wherein the RL-SIG is the L-SIG negated.

In Example 17, the subject matter of Examples 15-16 includes, wherein the legacy preamble comprises a legacy signal field (L-SIG) and a repeated L-SIG (RL-SIG), and wherein the processing circuitry is further configured to: encode a packet type of the EHT PPDU as a value of a rate field of the L-SIG and the RL-SIG. In Example 18, the subject matter of Example 17 includes, Mb/s.

In Example 19, the subject matter of Examples 17-18 includes, wherein the packet type is a short acknowledgement and the EHT PPDU comprises one or two symbols after the legacy preamble.

In Example 20, the subject matter of Examples 16-19 includes, wherein the processing circuitry comprises one or more application specific integrated circuits (ASICs).

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20. Example 23 is a system to implement of any of Examples 1-20. Example 24 is a method to implement of any of Examples 1-20.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising memory; and processing circuitry coupled to the memory, the processing circuitry configured to:
   decode a preamble portion of a multi-user (MU) physical layer (PEW) protocol data unit (PPDU), the preamble portion of the MU PPDU comprising a universal (U) signal (SIG) (U-SIG) field, the U-SIG field comprising a number of EHT signal (EHT-SIG) symbols field, the number of EHT-SIG symbols field indicating a number of symbols of an EHT-SIG field, the EHT-SIG field comprising a resource unit (RU) allocation field, the RU allocation field indicating a table index value, the table index value indicating a row of an RU assignment table, the row of the RU assignment table comprising a plurality of frequency RUs and a number of STAs allocated to each frequency RU of the plurality of frequency RUs, the EHT-SIG field further comprising a user field, the user field comprising a station identification field indicating an identification of the STA and a spatial configuration field, the spatial configuration field indicating an index of a row of a spatial configuration table, the row of the spatial configuration table indicating a position and number of spatial streams allocated to the STA for a frequency RU of the plurality of frequency RUs, wherein the spatial configuration field is six bits; and
   decode a data portion of the MU PPDU in accordance with the frequency RU of the plurality of frequency RUs and the position and number of spatial streams for the frequency RU allocated to the STA.

2. The apparatus of claim 1, wherein the number of spatial streams is 1, 2, 3, or 4.

3. The apparatus of claim 1, wherein
   the U-SIG field comprises a bandwidth field, wherein the bandwidth field is 5 bits.

4. The apparatus of claim 3, wherein the bandwidth field indicates 320 MHz.

5. The apparatus of claim 3, wherein the bandwidth field indicates 320 MHz with preamble puncturing.

6. The apparatus of claim 1, wherein the spatial configuration table is based on the number of STAs, and wherein the memory is configured to store the RU assignment table and the spatial configuration table.

7. The apparatus of claim 1, wherein the user field comprises a plurality of user fields, and wherein the user field is one of the plurality of user fields, and wherein the processing circuitry is further configured to:
   determine the frequency RU of the plurality of frequency RUs allocated to the STA based on a position of the user field within the plurality of user fields.

8. The apparatus of claim 1, wherein
   the U-SIG field comprises a number of space time streams (Nsts) field, the Nsts field indicates a number of Nsts from 1 to 16.

9. The apparatus of claim 1, wherein the EHT-SIG symbols field is greater than 4 bits.

10. The apparatus of claim 9, wherein the number of symbols of the EHT-SIG field is based on a number of the plurality of user fields.

11. The apparatus of claim 1,
    wherein following the data portion is a packet extension portion of the MU PPDU, the packet extension portion having a length based on an estimated processing time needed to decode the MU PPDU, wherein the length is 20 μs.

12. The apparatus of claim 1, wherein the processing circuitry is further configured to:
    decode a legacy signal field (L-SIG) and a repeat (L-SIG) (RL-SIG), the L-SIG and RL-SIG part of the preamble portion; and
    determine the MU PPDU is an extremely-high throughput (EHT) MU PPDU based on the RL-SIG being the L-SIG negated.

13. The apparatus of claim 12, wherein the L-SIG and the RL-SIG comprise a rate field, and wherein the processing circuitry is further configured to:
    determine a type of packet of the MU PPDU based on a value of a rate field, the value indicating a rate different than 6 Mb/s.

14. The apparatus of claim 1 further comprising: mixer circuitry to downconvert RF signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals including the MU PPDU.

15. The apparatus of claim 1 further comprising: mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the MU PPDU.

16. A non-transitory computer-readable storage medium that stores instructions for execution by one or more processors of an apparatus of a station (STA), the instructions to configure the one or more processors to:
 decode a preamble portion of a multi-user (MU) physical layer (PHY) protocol data unit (PPDU), the preamble portion of the MU PPDU comprising a universal (U) signal (SIG) (U-SIG) field, the U-SIG field comprising a number of EHT signal (EHT-SIG) symbols field the number of EHT-SIG symbols field indicating a number of symbols of an EHT-SIG field, the EHT-SIG field comprising a resource unit (RU) allocation field, the RU allocation field indicating a table index value, the table index value indicating a row of an RU assignment table, the row of the RU assignment table comprising a plurality of frequency RUs and a number of STAs allocated to each frequency RU of the plurality of frequency RUs, the EHT-SIG field further comprising a user field, the user field comprising a station identification field indicating an identification of the STA and a spatial configuration field, the spatial configuration field indicating an index of a row of a spatial configuration table, the row of the spatial configuration table indicating a position and number of spatial streams allocated to the STA for a frequency RU of the plurality of frequency RUs, wherein the spatial configuration field is six bits; and
 decode a data portion of the MU PPDU in accordance with the frequency RU of the plurality of frequency RUs and the position and number of spatial streams for the frequency RU allocated to the STA.

17. The non-transitory computer-readable storage medium of claim 16, wherein
 the U-SIG comprises a bandwidth field, wherein the bandwidth field is 5 bits.

18. An apparatus of an access point (AP), the apparatus comprising memory; and processing circuitry coupled to the memory, the processing circuitry configured to:
 encode a preamble portion of a molt-user (MU) physical layer (PHY) protocol data unit (PPDU), the preamble portion of the MU PPDU comprising a universal (U) signal (SIG) (U-SIG) field, the U-SIG field comprising a number of EHT signal (EHT-SIG) symbols field, the number of EHT-SIG symbols field indicating a number of symbols of an EHT-SIG field, the EHT-SIG field, the EHT-SIG field comprising a resource unit (RU) allocation field, the RU allocation field indicating a table index value, the table index value indicating a row of an RU assignment table, the row of the RU assignment table comprising a plurality of frequency RUs and a number of STAs allocated to each frequency RU of the plurality of frequency RUs, the EHT-SIG field further comprising user fields, the user fields comprising station identification fields and spatial configuration fields, the spatial configuration fields each indicating an index of a row of a spatial configuration table, the row of the spatial configuration table indicating a position and number of spatial streams for a frequency RU of the plurality of frequency RUs allocated to each of the station indicated by the station identification fields, wherein the spatial configuration field is six bits;
 encode a data portion of the MU PPDU in accordance with the frequency RU of the plurality of frequency RUs allocated to the stations and the position and number of spatial streams allocated to the stations; and
 configure the AP to transmit the MU PPDU.

19. The apparatus of claim 18, wherein
 the U-SIG comprises a bandwidth field, wherein the bandwidth field is 5 bits.

20. The apparatus of claim 18, further comprising transceiver circuitry; the transceiver circuitry coupled to the processing circuitry.

\* \* \* \* \*

UNITED STATES PATENT AND TRADEMARK OFFICE
CERTIFICATE OF CORRECTION

PATENT NO. : 11,128,505 B2  
APPLICATION NO. : 16/783666  
DATED : September 21, 2021  
INVENTOR(S) : Chen et al.

Page 1 of 1

It is certified that error appears in the above-identified patent and that said Letters Patent is hereby corrected as shown below:

On the Title Page

Item (60), "Related U.S. Application Data", in Column 1, Line 1, delete "62/804,796," and insert --62/801,796,-- therefor In the Claims In Column 33, Line 57, in Claim 1, delete "(PEW)" and insert --(PHY)-- therefor In Column 35, Line 22, in Claim 16, after "field", insert --,--

In Column 36, Line 8, in Claim 18, delete "molt-user" and insert --multi-user-- therefor Signed and Sealed this  
Thirtieth Day of November, 2021

Drew Hirshfeld  
*Performing the Functions and Duties of the  
Under Secretary of Commerce for Intellectual Property and  
Director of the United States Patent and Trademark Office*